(12) United States Patent
Song et al.

(10) Patent No.: US 11,814,904 B2
(45) Date of Patent: Nov. 14, 2023

(54) CUTTING STRUCTURE OF CUTTING ELEMENTS FOR DOWNHOLE CUTTING TOOLS

(71) Applicant: Smith International, Inc., Houston, TX (US)

(72) Inventors: Huimin Song, Spring, TX (US);
Xiaoge Gan, Houston, TX (US);
Zhijun Lin, The Woodlands, TX (US);
Ke Chen, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/990,997

(22) Filed: May 29, 2018

(65) Prior Publication Data
US 2018/0274303 A1    Sep. 27, 2018

Related U.S. Application Data

(63) Continuation-in-part of application No. PCT/US2016/063708, filed on Nov. 24, 2016, and a
(Continued)

(51) Int. Cl.
*E21B 10/567*      (2006.01)
*E21B 10/573*      (2006.01)
(Continued)

(52) U.S. Cl.
CPC .......... *E21B 10/5673* (2013.01); *E21B 10/55* (2013.01); *E21B 10/5735* (2013.01); *B22F 2005/001* (2013.01)

(58) Field of Classification Search
CPC .. E21B 10/5673; E21B 10/55; E21B 10/5735; B22F 2005/001
See application file for complete search history.

(56) References Cited

U.S. PATENT DOCUMENTS 4,148,368 A   4/1979   Evans
4,339,009 A   7/1982   Busby
(Continued)

FOREIGN PATENT DOCUMENTS

WO   WO2015138060 A1   9/2015

OTHER PUBLICATIONS

First Office Action and Search Report issued in Chinese patent application 201680070003.X dated Jun. 24, 2019, 11 pages.
(Continued)

*Primary Examiner* — Christopher J Sebesta
*Assistant Examiner* — Neel Girish Patel
(74) *Attorney, Agent, or Firm* — Jeffrey D. Frantz

(57) ABSTRACT

A cutting element may include a substrate; and an ultrahard layer on the substrate, the substrate and the ultrahard layer defining a non-planar working surface of the cutting element such that the ultrahard layer forms a cutting portion and the substrate is at least laterally adjacent to the ultrahard layer. Another cutting element includes a pointed region having a side surface extending from the pointed region outer perimeter to a peak. An ultrahard material body forms a portion of the pointed region including the peak, and a base region extends a depth from the pointed region outer perimeter. The ultrahard material body has a height to width aspect ratio with the height and width measured between two points of the body having the greatest distance apart along a dimension parallel with a longitudinal axis (i.e., height) along a dimension perpendicular to the longitudinal axis (i.e., width).

18 Claims, 21 Drawing Sheets

Related U.S. Application Data continuation-in-part of application No. PCT/US2016/063707, filed on Nov. 24, 2016.

(60) Provisional application No. 62/261,071, filed on Nov. 30, 2015, provisional application No. 62/261,042, filed on Nov. 30, 2015.

(51) Int. Cl.
*E21B 10/55* (2006.01)
*B22F 5/00* (2006.01)

(56) References Cited

U.S. PATENT DOCUMENTS

| | | | |
|---|---|---|---|
| 5,172,777 A | 12/1992 | Siracki et al. | |
| 5,273,125 A | 12/1993 | Jurewicz | |
| 5,348,108 A * | 9/1994 | Scott | E21B 10/56 |
| | | | 175/434 |
| 5,605,198 A * | 2/1997 | Tibbitts | E21B 10/43 |
| | | | 175/432 |
| 5,871,060 A * | 2/1999 | Jensen | E21B 10/5673 |
| | | | 175/420.2 |
| 6,131,678 A | 10/2000 | Griffin | |
| 6,148,937 A * | 11/2000 | Mensa-Wilmot | E21B 10/5735 |
| | | | 175/428 |
| 6,227,318 B1 * | 5/2001 | Siracki | E21B 10/5676 |
| | | | 175/426 |
| 6,460,636 B1 * | 10/2002 | Yong | E21B 17/1092 |
| | | | 175/428 |
| 6,527,069 B1 * | 3/2003 | Meiners | E21B 10/567 |
| | | | 175/432 |
| 6,852,414 B1 | 2/2005 | Frushour | |
| 7,316,279 B2 | 1/2008 | Wiseman et al. | |
| 7,798,257 B2 * | 9/2010 | Shen | E21B 10/5735 |
| | | | 175/430 |
| 8,205,692 B2 * | 6/2012 | McDonough | E21B 10/16 |
| | | | 175/336 |
| 8,434,346 B2 | 5/2013 | Reese et al. | |
| 8,757,299 B2 * | 6/2014 | DiGiovanni | C22C 26/00 |
| | | | 175/428 |
| 8,763,731 B2 | 7/2014 | Scott et al. | |
| 9,316,058 B2 * | 4/2016 | Bilen | E21B 10/58 |
| 2001/0004026 A1 * | 6/2001 | Lockstedt | E21B 10/16 |
| | | | 175/431 |
| 2007/0119631 A1 | 5/2007 | Eyre et al. | |
| 2008/0156543 A1 * | 7/2008 | McDonough | E21B 10/16 |
| | | | 175/336 |
| 2008/0156545 A1 * | 7/2008 | Tibbitts | E21B 10/573 |
| | | | 175/434 |
| 2008/0282619 A1 | 11/2008 | Tank | |
| 2012/0012401 A1 * | 1/2012 | Gonzalez | C04B 35/528 |
| | | | 175/428 |
| 2012/0103700 A1 * | 5/2012 | Lin | E21B 10/56 |
| | | | 175/428 |
| 2014/0134403 A1 * | 5/2014 | Gledhill | B32B 3/30 |
| | | | 428/156 |
| 2015/0129322 A1 * | 5/2015 | Hall | B24D 3/06 |
| | | | 175/430 |

OTHER PUBLICATIONS

International Preliminary Report on Patentability issued in International Patent application PCT/US2016/063707, dated Jun. 5, 2018, 10 pages.

International Preliminary Report on Patentability issued in International Patent application PCT/US2016/063708, dated Jun. 5, 2018, 11 pages.

International Search Report and Written Opinion issued in International Patent Application No. PCT/US2016/063707 dated Mar. 9, 2017, 14 pages.

International Search Report and Written Opinion issued in International Patent Application No. PCT/2016/063708 dated May 9, 2017, 15 pages.

Second Office Action issued in Chinese patent application 201680070003.X dated Jan. 8, 2020, 7 pages.

Third Office Action issued in Chinese patent application 201680070003.X dated Aug. 3, 2020, 7 pages with English translation.

Rejection Decision issued in Chinese patent application 201680070003.X dated Jan. 13, 2021, 7 pages with partial English translation.

Second Notification of Reexamination of Chinese Patent Application No. 201680070003.X dated Jun. 7, 2023, 11 pages.

* cited by examiner

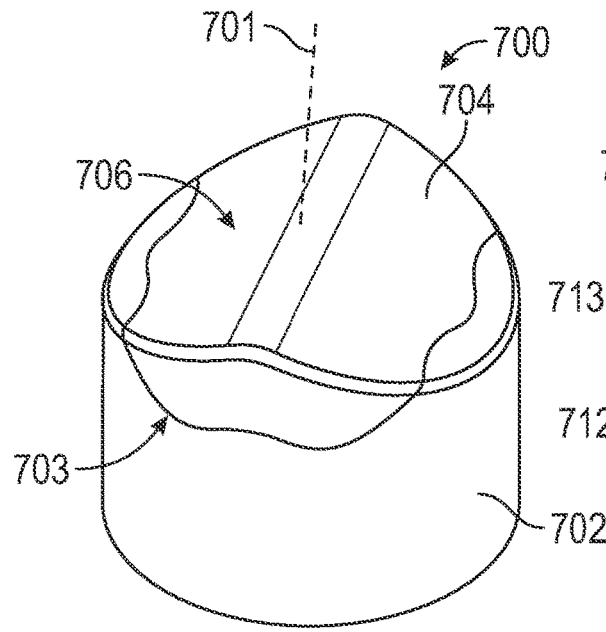 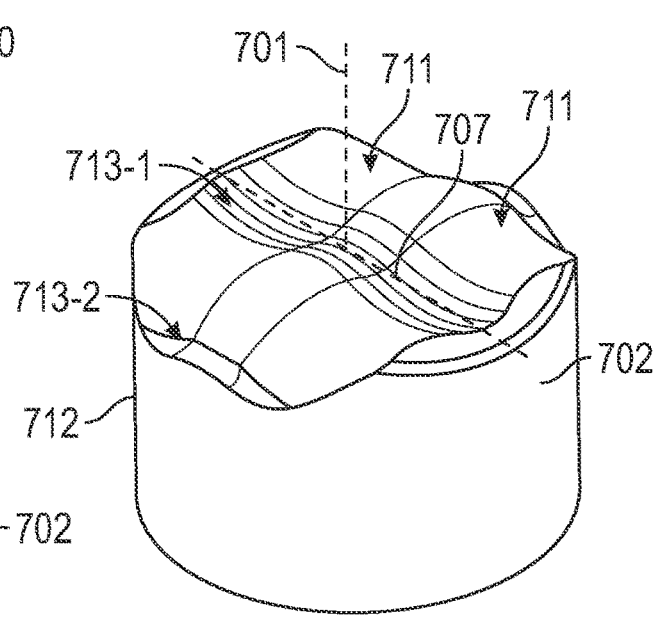
FIG. 7-1     FIG. 7-2
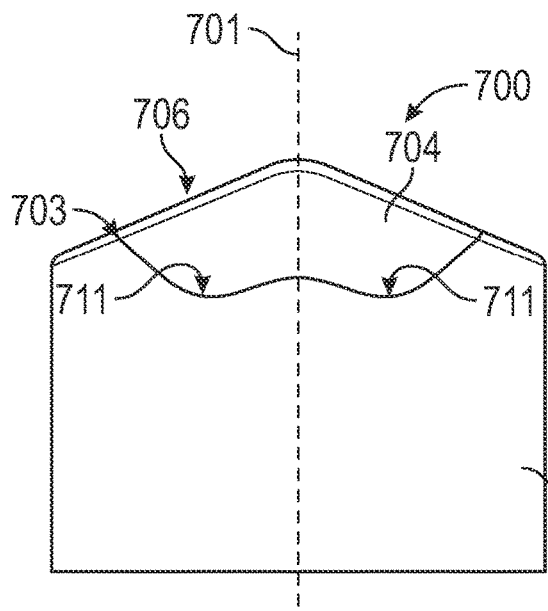 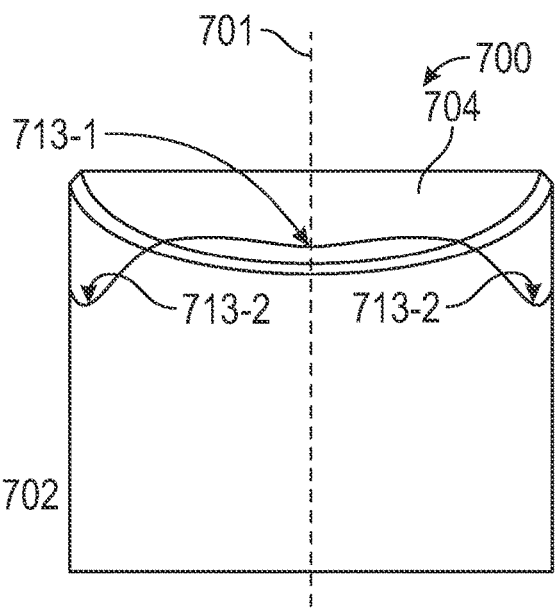
FIG. 7-3     FIG. 7-4

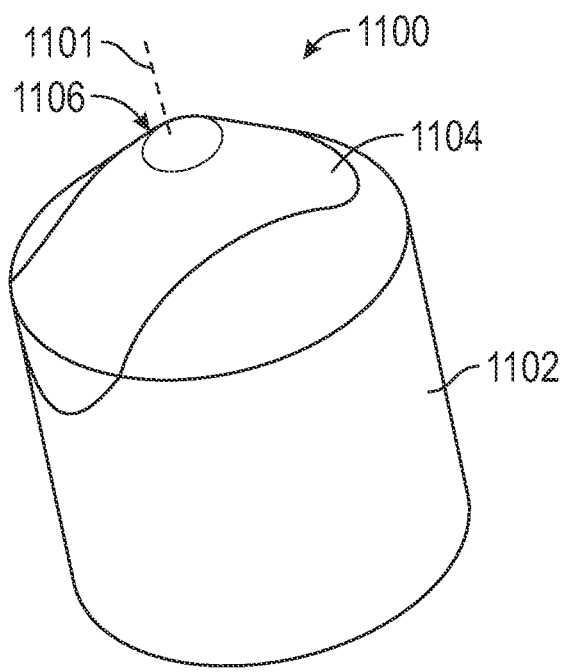
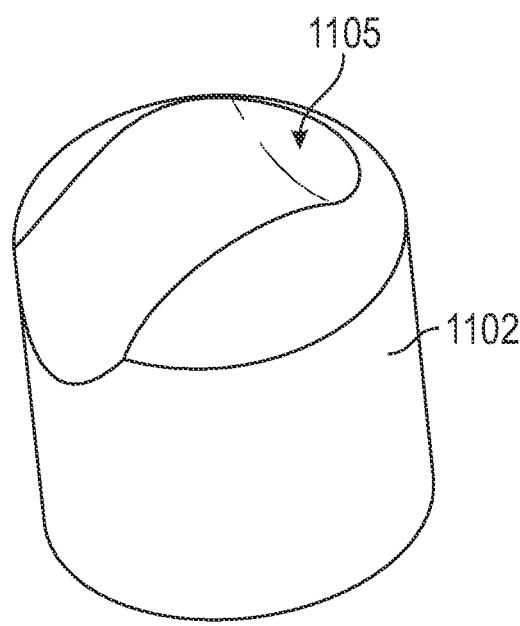
FIG. 11-1
FIG. 11-2
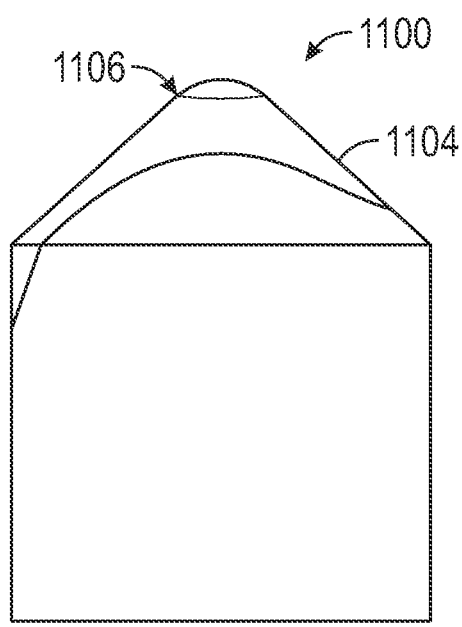
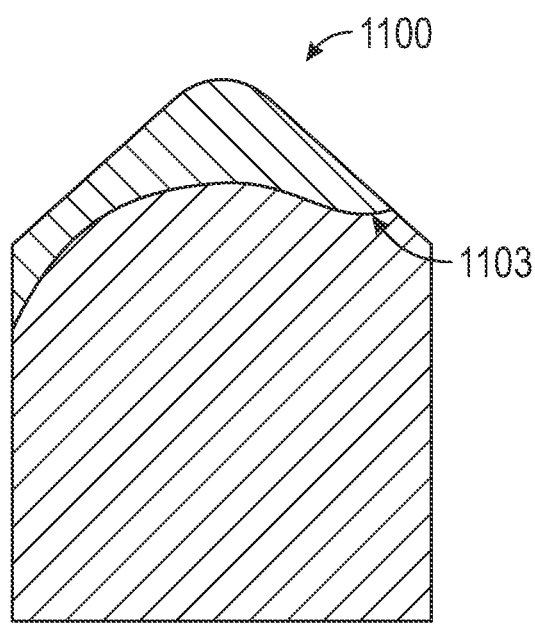
FIG. 11-3
FIG. 11-4

CUTTING STRUCTURE OF CUTTING ELEMENTS FOR DOWNHOLE CUTTING TOOLS

CROSS-REFERENCE TO RELATED APPLICATIONS

This application is a continuation-in-part of International Patent Application No. PCT/US2016/063707, filed Nov. 24, 2016, which claims the benefit of, and priority to, U.S. Patent Application No. 62/261,042, filed Nov. 30, 2015. This application is also a continuation-in-part of International Patent Application No. PCT/US2016/063708, filed Nov. 24, 2016, which claims the benefit of, and priority to, U.S. Patent Application No. 62/261,071, filed Nov. 30, 2015. Each of the foregoing applications is expressly incorporated herein by this reference in its entirety.

BACKGROUND

There are several types of downhole cutting tools, such as drill bits, including roller cone bits, hammer bits, and drag bits, reamers and milling tools. Roller cone rock bits include a bit body adapted to be coupled to a rotatable drill string and include at least one "cone" that is rotatably mounted to a cantilevered shaft or journal. Each roller cone in turn supports a plurality of cutting elements that cut and/or crush the wall or floor of the borehole and thus advance the bit. The cutting elements, either inserts or milled teeth, contact with the formation during drilling. Hammer bits generally include a one piece body having a crown. The crown includes inserts pressed therein for being cyclically "hammered" and rotated against the earth formation being drilled.

Drag bits, often referred to as "fixed cutter drill bits," include bits that have cutting elements attached to the bit body, which may be a steel bit body or a matrix bit body formed from a matrix material such as tungsten carbide surrounded by a binder material. Drag bits may generally be defined as bits that have no moving parts. However, there are different types and methods of forming drag bits that are known in the art. For example, drag bits having abrasive material, such as diamond, impregnated into the surface of the material which forms the bit body are commonly referred to as "impreg" bits. Drag bits having cutting elements made of an ultrahard cutting surface layer or "table" (generally made of polycrystalline diamond material or polycrystalline boron nitride material) deposited onto or otherwise bonded to a substrate are known in the art as polycrystalline diamond compact ("PDC") bits.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a cutting element that includes a substrate and an ultrahard layer on the substrate, where the substrate and the ultrahard layer defining a non-planar working surface of the cutting element such that the ultrahard layer forms a cutting portion and the substrate is at least laterally adjacent to the ultrahard layer.

In another aspect, embodiments disclosed herein relate to a cutting tool that includes a tool body; a plurality of blades extending from the tool body; and at least one cutting element attached to one of the plurality of blades. The cutting element includes a substrate; and an ultrahard layer on the substrate, the substrate and the ultrahard layer defining a non-planar working surface of the cutting element such that the ultrahard layer forms a cutting portion and the substrate is at least laterally adjacent to the ultrahard layer.

In yet another aspect, embodiments disclosed herein relate to a cutting tool that includes a tool body; a plurality of blades extending from the tool body; and at least one cutting element attached to one of the plurality of blades, the at least one cutting element having a non-planar working surface and including a substrate and an ultrahard layer, the non-planar working surface being defined by both the substrate and the ultrahard layer.

In one aspect, embodiments of the present disclosure relate to a cutting element that includes a pointed region having a side surface extending from a pointed region outer perimeter to a peak, an ultrahard material body forming a portion of the pointed region including the peak, and a base region extending a depth from the pointed region outer perimeter. The ultrahard material body may have a height to width aspect ratio of greater than 3:4, the height defined between two points of the ultrahard material body having the greatest distance apart along a dimension parallel with a longitudinal axis of the cutting element, and the width defined between two points of the ultrahard material body having the greatest distance apart along a dimension perpendicular to the longitudinal axis.

In another aspect, embodiments of the present disclosure relate to a cutting element that includes a pointed region having a side surface extending a height from a pointed region outer perimeter to a peak, a base region extending a depth from the pointed region outer perimeter, and an ultrahard material body positioned a distance from the base region and forming a portion of the pointed region including the peak, the distance ranging from 10% to 50% of the height of the pointed region.

In yet another aspect, embodiments of the present disclosure relate to a cutting element that includes a pointed region extending a height from a base region, the pointed region having a side surface extending from a pointed region outer perimeter to a peak, a substrate forming the base region and a portion of the pointed region, and an ultrahard material body forming the peak and a portion of the pointed region side surface, the ultrahard material body having an outer perimeter less than the pointed region outer perimeter by at least 20%.

Other aspects and features of the claimed subject matter will be apparent from the following description and the appended claims.

BRIEF DESCRIPTION OF DRAWINGS

In order to describe the manner in which the above-recited and other features of the disclosure can be obtained, a more particular description will be rendered by reference to specific embodiments thereof which are illustrated in the appended drawings. While some of the drawings may be schematic or exaggerated representations of concepts, other drawings may be considered as drawn to scale for some illustrative embodiments, but not to scale for other embodiments. For instance, figures of cutting elements should be considered to scale for at least a 13 mm or 16 mm cutting element, but may not be to scale Understanding that the drawings depict some example embodiments, the embodiments will be described and explained with additional specificity and detail through the use of the accompanying drawings in which:

FIG. 1-2 is a cutter used in the fixed cutter drill bit of FIG. 1-1, according to embodiments of the present disclosure.

FIG. 2-1 is a cross-sectional profile view of a non-planar cutting element according to embodiments of the present disclosure.

FIG. 2-2 is a cross-sectional profile view of another non-planar cutting element according to embodiments of the present disclosure.

FIG. 2-3 is a cross-sectional profile view of yet another non-planar cutting element according to embodiments of the present disclosure.

FIG. 3 is a bottom view of a downhole cutting tool having non-planar cutting elements according to embodiments of the present disclosure.

FIG. 4-1 is a perspective view of a cutting element having a non-planar working surface according to embodiments of the present disclosure.

FIG. 4-2 is a perspective view of the substrate of the cutting element of FIG. 4-1, according to an embodiment of the present disclosure.

FIG. 4-3 is a cross-sectional view of the cutting element of FIG. 4-1, according to an embodiment of the present disclosure.

FIG. 4-4 is a side view of the cutting element of FIG. 4-1, according to an embodiment of the present disclosure.

FIG. 5-1 is a top view of an embodiment of a cutting element having a non-planar working surface.

FIG. 5-2 is a cross-sectional view of the cutting element of FIG. 5-1, according to an embodiment of the present disclosure.

FIG. 5-3 is a perspective view of the substrate of the cutting element of FIG. 5-1, according to an embodiment of the present disclosure.

FIG. 6-1 is a perspective view of an embodiment of a cutting element having a non-planar working surface.

FIG. 6-2 is a perspective view of the substrate of the cutting element of FIG. 6-1, according to an embodiment of the present disclosure.

FIG. 6-3 is a side view of the cutting element of FIG. 6-1, according to an embodiment of the present disclosure.

FIG. 6-4 is a side view of the cutting element of FIG. 6-1, according to an embodiment of the present disclosure.

FIG. 7-1 is a perspective view of an embodiment of a cutting element having a non-planar working surface.

FIG. 7-2 is a perspective view of the substrate of the cutting element of FIG. 7-1, according to an embodiment of the present disclosure.

FIG. 7-3 is a side view of the cutting element of FIG. 7-1, according to an embodiment of the present disclosure.

FIG. 7-4 is a side view of the cutting element of FIG. 7-1, according to an embodiment of the present disclosure.

FIG. 8-1 is a perspective view of an embodiment of a cutting element having a non-planar working surface.

FIG. 8-2 is a perspective view of the substrate of the cutting element of FIG. 8-1, according to an embodiment of the present disclosure.

FIG. 8-3 is a side view of the substrate of the cutting element of FIG. 8-2, according to an embodiment of the present disclosure.

FIG. 9-1 is a perspective view an embodiment of a cutting element having a non-planar working surface.

FIG. 9-2 is a perspective view of the substrate of the cutting element of FIG. 9-1, according to an embodiment of the present disclosure.

FIG. 9-3 is a side view of the cutting element of FIG. 9-1, according to an embodiment of the present disclosure.

FIG. 9-4 is a cross-sectional view of the cutting element of FIG. 9-1, according to an embodiment of the present disclosure.

FIG. 10-1 is a perspective view of a cutting element having a non-planar working surface.

FIGS. 10-2 to 10-4 are views of the substrate of the cutting element of FIG. 10-1, according to an embodiment of the present disclosure.

FIG. 11-1 is a perspective view of an embodiment of a cutting element having a non-planar working surface.

FIG. 11-2 is a perspective view of the substrate of the cutting element of FIG. 11-1, according to an embodiment of the present disclosure.

FIG. 11-3 is a side view of the cutting element of FIG. 11-1, according to an embodiment of the present disclosure.

FIG. 11-4 is a cross-sectional view of the cutting element of FIG. 11-1, according to an embodiment of the present disclosure.

FIG. 13-1 shows a cross-sectional view of a non-planar cutting element according to embodiments of the present disclosure.

FIG. 13-2 is a top view of the non-planar cutting element of FIG. 13-1 according to embodiments of the present disclosure.

FIG. 15-1 is a cross-sectional view of a non-planar cutting element according to embodiments of the present disclosure.

FIG. 15-2 is a top view of the non-planar cutting element of FIG. 15-1 according to embodiments of the present disclosure.

DETAILED DESCRIPTION

In some aspects, embodiments disclosed herein relate to cutting elements having non-planar working surfaces and to cutting tools having such cutting elements attached thereto. In particular, some embodiments disclosed herein relate to a cutting element having a non-planar working surface. In at least some embodiments, the non-planar surface is formed of both substrate and diamond. In the same or other embodiments, the downhole drilling tools are used for gouging, plowing, or wedge-type cutting actions in drilling or for coring.

Figure 1:
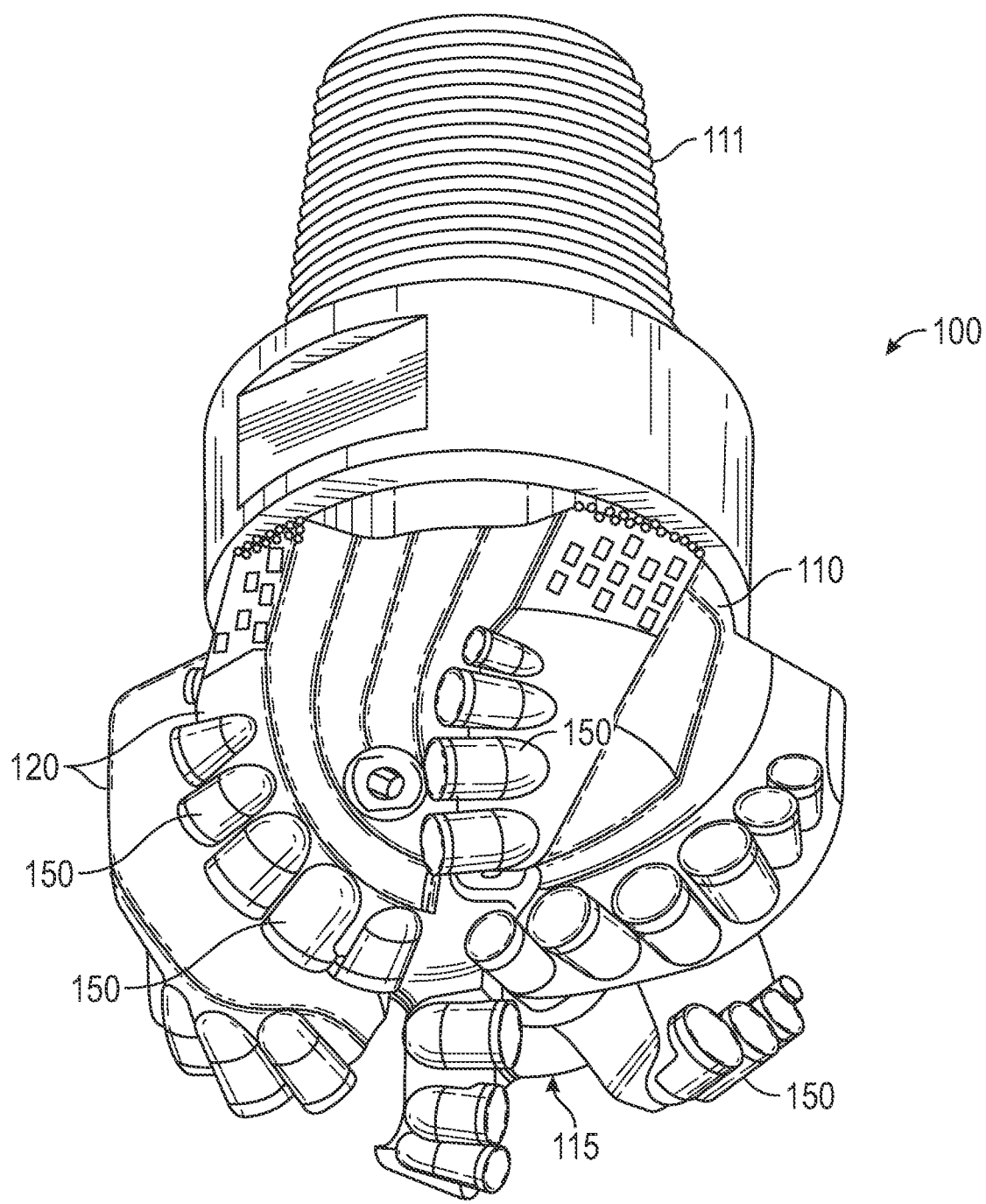
FIG. 1-1 is a perspective view of a fixed cutter drill bit according to embodiments of the present disclosure.

An example of a drag bit having a plurality of cutting elements with ultrahard working surfaces is shown in FIG. 1. The drill bit 100 includes a bit body 110 having a threaded upper pin end 111 and a cutting end 115. The cutting end 115 generally includes a plurality of ribs or blades 120 arranged about the rotational axis (also referred to as the longitudinal or central axis) of the drill bit and extending radially outward from the bit body 110. Cutting elements, or cutters, 150 are embedded in the blades 120 at predetermined angular orientations and radial locations relative to a working surface and with a desired back rake angle and side rake angle against a formation to be drilled.

Figures 1, 2:
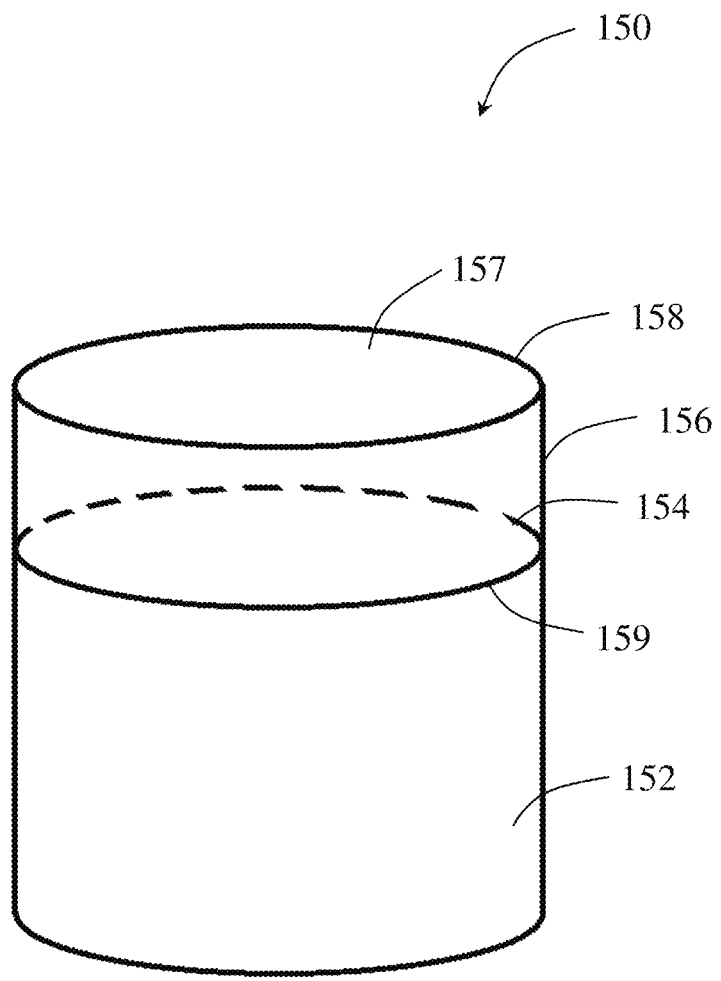

FIG. 1-2 shows an example of a cutting element 150 of FIG. 1, wherein the cutting element 150 has a cylindrical cemented carbide substrate 152 having an end face or upper surface referred to herein as a substrate interface surface 154. An ultrahard material layer 156, also referred to as a cutting layer, has a top surface 157, also referred to as a working surface, a cutting edge 158 formed around the top surface, and a bottom surface, referred to herein as an ultrahard material layer interface surface 159. The ultrahard material layer 156 may be a polycrystalline diamond or polycrystalline cubic boron nitride layer. The ultrahard material layer interface surface 159 is bonded to the substrate interface surface 154 to form a planar interface between the substrate 152 and ultrahard material layer 156.

While cutting elements may be planar as shown in FIG. 1-2, cutting elements according to the present disclosure may have other shapes. In some embodiments, the cutting elements are non-planar cutting elements. "Pointed cutting elements" are a type of non-planar cutting element" and refer to cutting elements having a non-planar cutting face, forming a generally pointed cutting end. According to embodiments of the present disclosure, a pointed cutting element may have a generally pointed region extending a height from a base region. A pointed region may include a cutting end terminating in a rounded peak, a truncated or flattened peak, or an elongated peak (e.g., a peak extending a distance across the cutting face, where in a cross-sectional view along an axial plane, a rounded, truncated, or flattened peak is defined—such as where the peak is defined as a ridge across at least a portion of the cutting element).

Figures 1, 2:
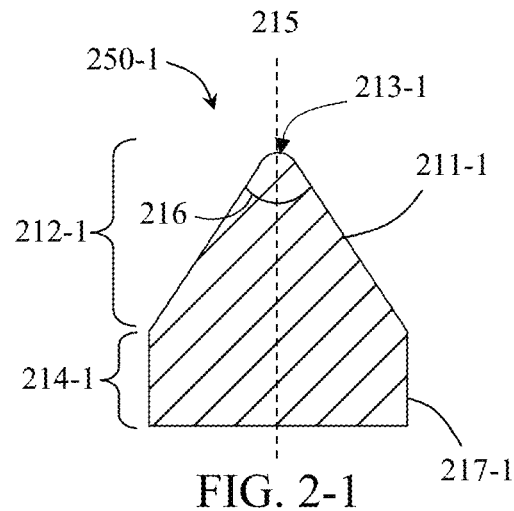
Figure 2:
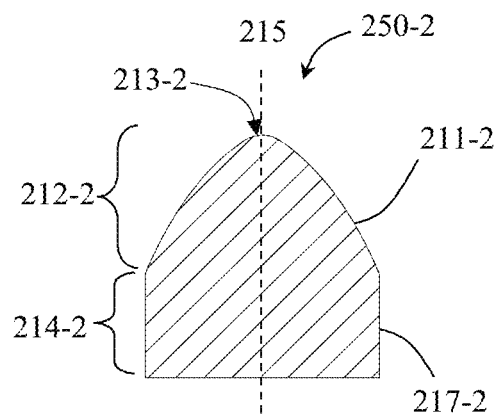
Figures 2, 3:
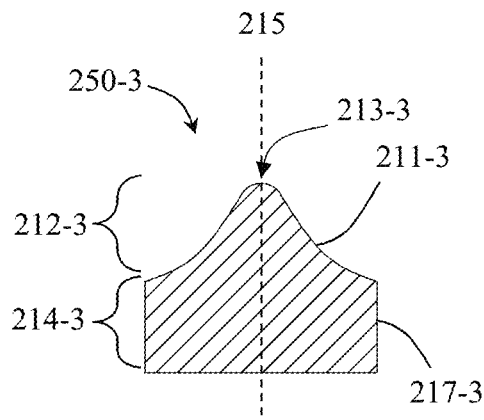
Figure 3:
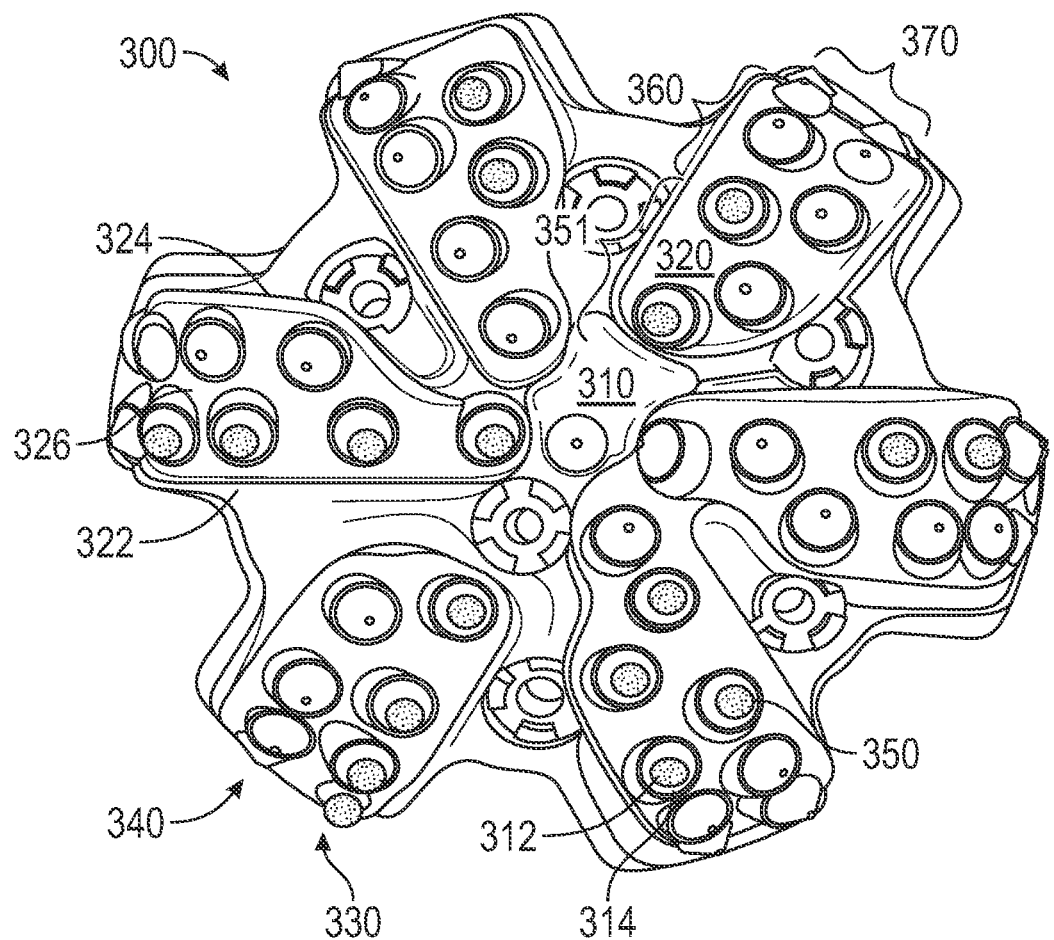

Pointed cutting elements may include, for example, cutting elements having a conical cutting end such as shown in FIG. 2-1, a bullet cutting end such as shown in FIG. 2-2, or other pointed cutting ends such as shown in FIG. 2-3. As shown in FIG. 2-1, a cutting element 250-1 has a generally conical cutting end (including either right cones, oblique cones, or a ridged cutting element which appears conical in cross-section) with a pointed region 212-1 extending a height from a base region 214-1, where the pointed region 212-1 has a conical side wall 211-1 (or opposing side walls 211-1 in the case of a ridge) that terminates or meet in a rounded peak 213-1. Unlike geometric cones that terminate at a sharp point apex, conical cutting end 250-1 possesses an apex having curvature between the side surface(s) and the apex.

As shown in FIG. 2-2, a cutting element 250-2 has a pointed region 212-2 extending a height from a base region 214-2. The pointed region 212-2 forms a bullet cutting end having, instead of a generally conical side surface, a generally convex side surface 211-2 terminating in a rounded peak 213-2. In one or more embodiments, the rounded peak 213-2 has a substantially smaller radius of curvature than the convex side surface 211-2.

A cutting element 250-3 having another example of a pointed region 212-3 extending a height from a base region 214-3 is shown in FIG. 2-3. The pointed region 212-3 has a concave side surface 211-3 terminating in a rounded peak 213-3. It is also intended that the pointed cutting elements of the present disclosure also include other pointed cutting end shapes having a rounded, truncated, or sharp peak. Pointed cutting elements may have a smooth transition between the side surface and the rounded apex (i.e., the side surface(s) or side wall(s) tangentially joins the curvature of the apex), but in some embodiments, a non-smooth transition may be present (i.e., the tangent of the side surface intersects the tangent of the apex at a non-180° angle, such as for example ranging from about 120° to less than 180°). In yet other embodiments, a side wall of a pointed region may terminate at a truncated peak.

The apex or rounded peak of a pointed region may have curvature, including a radius of curvature. In one or more embodiments, the radius of curvature may range from about 0.050 to 0.125 in. (1.27 to 3.18 mm). The apex/peak of one or more embodiments includes a radius of curvature having a lower limit, an upper limit, or lower and upper limits selected from any of 0.050 in. (1.27 mm), 0.060 in. (1.52 mm), 0.075 in. (1.91 mm), 0.085 in. (2.16 mm), 0.095 in. (2.41 mm), 0.100 in. (2.54 mm), 0.110 in. (2.79 mm), or 0.125 in. (3.18 mm). In some embodiments, the curvature includes a variable radius of curvature, a portion of a parabola, a portion of a hyperbola, a portion of a catenary, or a parametric spline. In one or more embodiments, a cone angle (shown as 216 in FIG. 2-1) measured between the side surface(s) of a pointed cutting element may range from 60° to 120°.

A base region of a pointed cutting element may include a region of the cutting element defined along the outermost perimeter (e.g., outer diameter, or OD) of the cutting element along its longitudinal axis and adjacent to the pointed region (at the outer perimeter of the pointed region). In other words, the base region may extend a depth from an axial position of the cutting element at its outermost (or largest) diameter that is adjacent the pointed region. In such embodiments, the outer perimeter of the pointed region may be substantially equal to the outermost diameter of the cutting element (where the base region extends from the outer perimeter of the pointed region to a base surface of the cutting element). In other embodiments, the base region may extend from the pointed region outer perimeter to a base surface of the cutting element, including a uniform cross section along a depth of the base region from the pointed region outer perimeter, where the outermost diameter of the cutting element is greater than the pointed region outer perimeter (e.g., where one or more raised bumps, ridges or retention features may protrude from the base region outer side surface at the depth from the pointed region outer perimeter).

For example, referring again to FIGS. 2-1 to 2-3, the outermost diameter of a pointed cutting element extends a distance along the longitudinal axis 215 from the pointed region 212-1, 212-2, 212-3 to form a cylindrical base region (where the outer side surface(s) 217-1, 217-2, 217-3 of the base region 214-1, 214-2, 214-3 is also the outermost diameter or largest diameter of the cutting element 250-1, 250-2, 250-3). However, in other embodiments, the outermost diameter of a pointed cutting element may have a different cross-sectional shape (e.g., oval, rounded polygon, etc.) forming a base region having a prism shape of its cross-sectional shape. In some embodiments, a base region may have a uniform cross-sectional shape and size along a partial depth of the base region and non-uniform cross-sectional shape and/or size extending another partial depth of the base region (e.g., one or more grooves, indentations, ridges, or protrusions at a depth apart from the pointed region).

According to embodiments of the present disclosure, a cutting element may include a pointed region having a side surface extending from a pointed region outer perimeter to a peak and a base region extending a depth from the pointed region outer perimeter, where an ultrahard material body forms a portion of the pointed region including the peak. In some embodiments, a substrate may form the remaining portion of the pointed region and the base region. In some embodiments, a substrate and at least one transition layer may form the remaining portion of the pointed region, and the substrate may form the base region.

Pointed cutting elements of the present disclosure may be attached to a downhole cutting tool, such as a fixed cutter bit, hybrid downhole drill bit, a reamer, or on roller cone bit, depending on the location of the cutting element and its cutting mechanism. For example, one or more pointed cutting elements may be attached within pockets formed in one or more blades extending from a tool body of a downhole cutting tool, or may be attached within pockets formed directly in the tool body of a downhole cutting tool. FIG. 3 is a bottom view of an example downhole tool having pointed cutting elements according to embodiments of the present disclosure. The downhole tool is a drill bit 300 having a bit body 310 and a plurality of blades 320 extending therefrom. Each blade 320 has a front face 322, a trailing face 324 opposite the front face, and a top face 326 (which may also be referred to as a formation-facing face or surface). An optional first row 330 of cutting elements is positioned closer to the leading edge (i.e., where the front face transitions to the top face) of at least one blade than an optional second row 340 of cutting elements, positioned along the top face 326 of the blade 320 and rearward of the first row 330 of cutting elements. One or more pointed cutting elements 350 according to embodiments of the present disclosure (e.g., having an ultrahard material body 312, form a portion of the cutting element pointed region, including the peak, and a substrate 314 form another portion of the cutting element pointed region) are in a first row, a second row, or in both the first and second rows of one or more blades. Cutting elements 350 according to embodiments of the present disclosure may be positioned along a cone region 351 (i.e., region of the bit around the central axis of the bit) of one or more blades 320, along a shoulder region 360 (i.e., region of the bit between the cone region and gage region) of one or more blades 320, and/or along a gage region 370 (i.e., region around the outer diameter of the bit) of one or more blades 320. Different combinations of non-planar cutting elements according to embodiments of the present disclosure and other types of cutting elements (having planar or non-planar cutting faces) may be positioned in one or more rows along a cone region, a shoulder region, and a gage region of a blade, or may be otherwise arranged (e.g., non-linearly, in angled rows, distributed in other ways that don't define rows) along one or more blades. For example, one or more cutting elements having a planar cutting face may be positioned in a leading row (formed along a leading edge of a blade) of cutting elements along the cone, shoulder, and/or gage region of the blade, and one or more cutting elements according to embodiments of the present disclosure may be positioned in a trailing row (rearward of the leading row) of cutting elements along the cone, shoulder, and/or gage region of a blade.

Figures 1, 4:
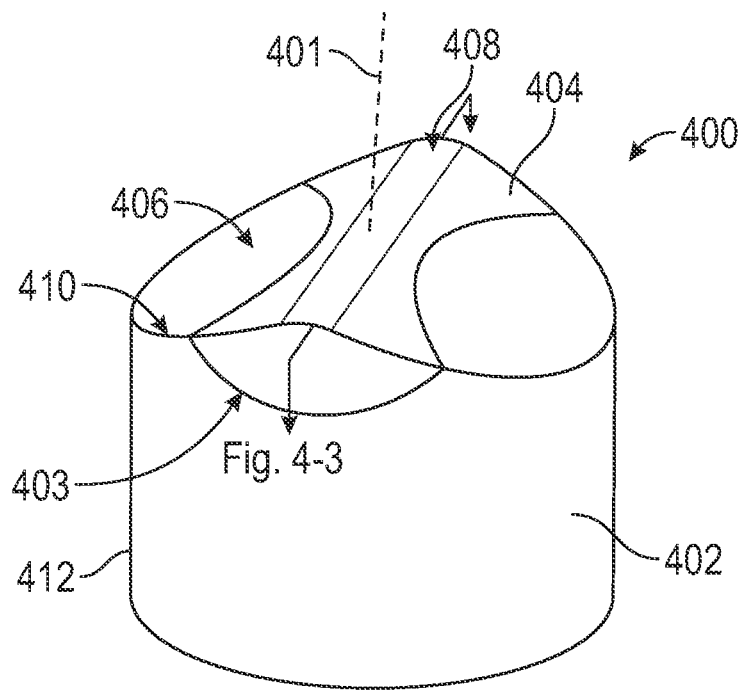
Figures 2, 4:
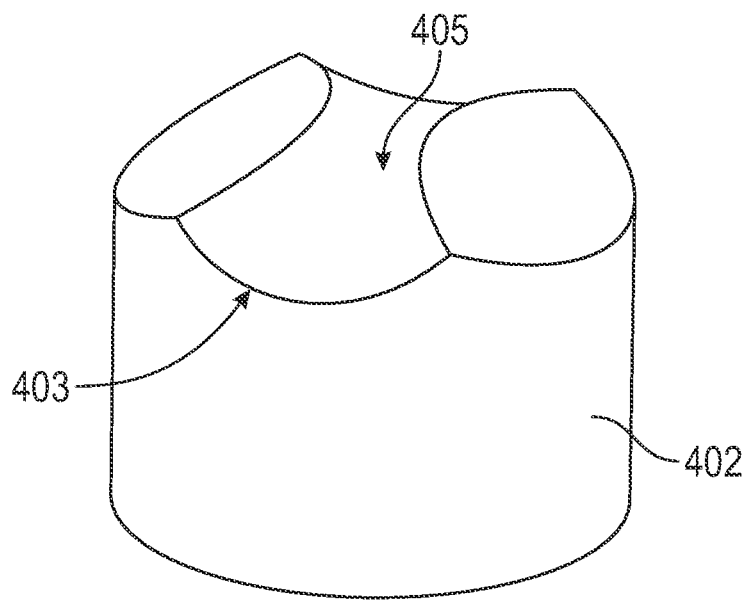
Figures 3, 4:
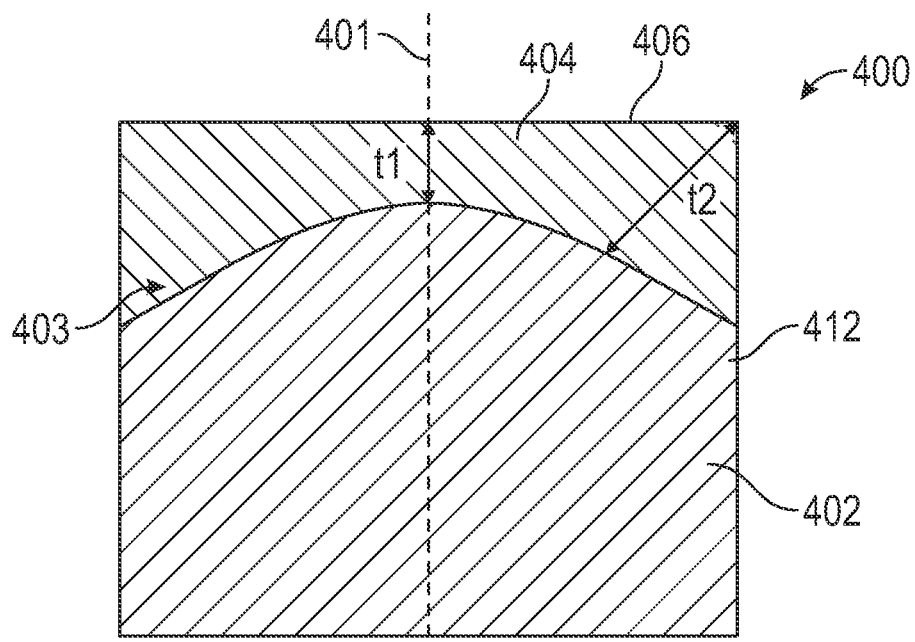
Figure 4:
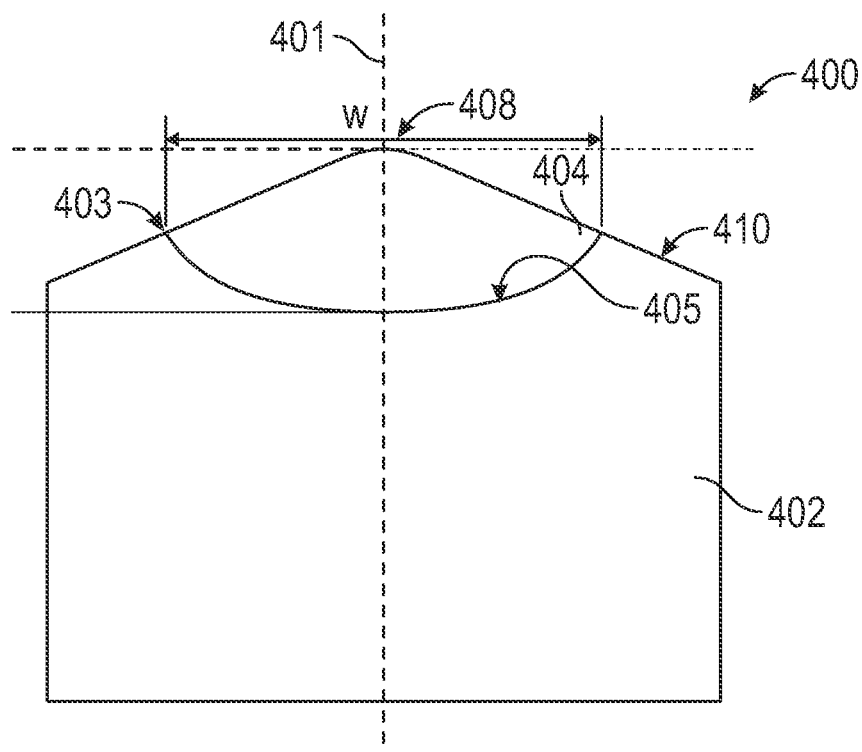
Figures 1, 9:
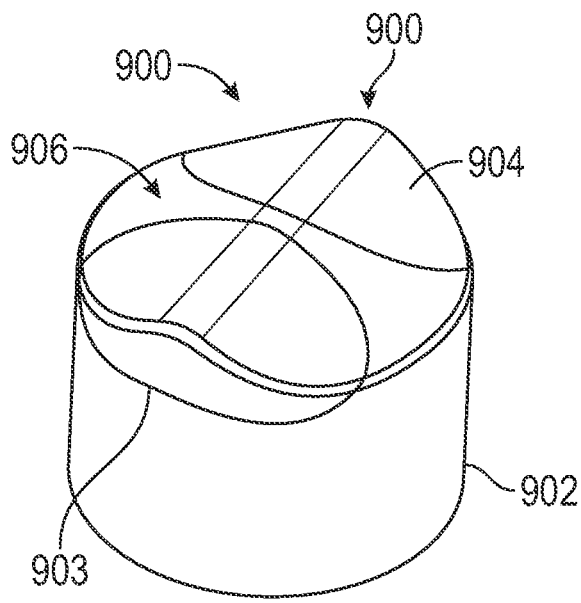
Figures 2, 9:
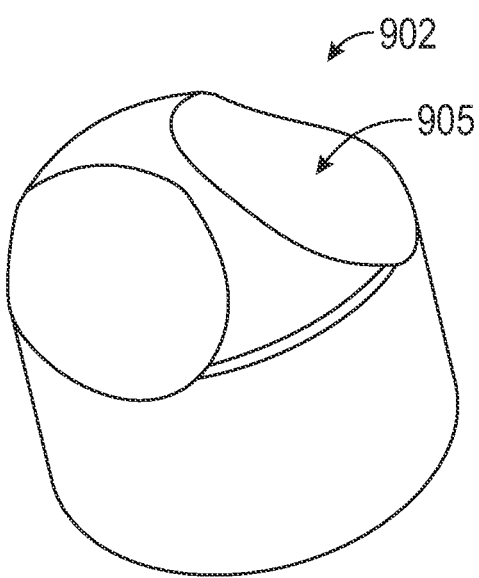
Figures 3, 9:
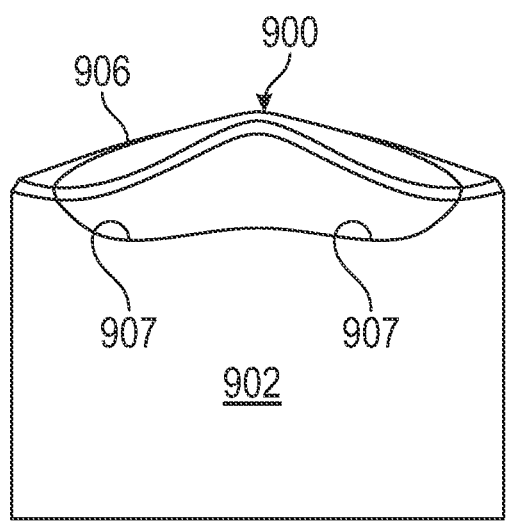
Figures 4, 9:
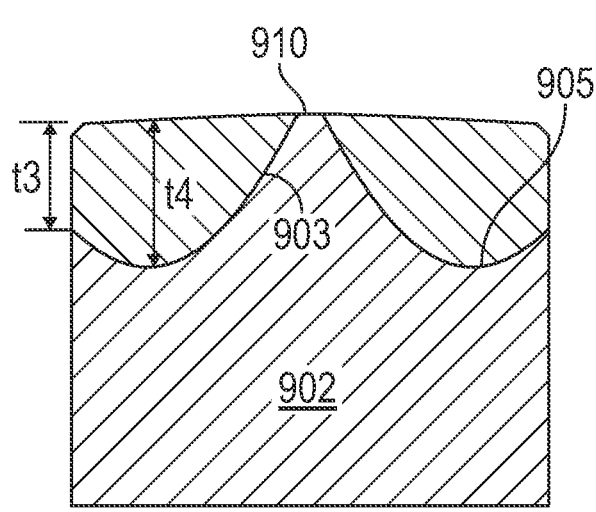

Referring to FIGS. 4-1 and 4-2 an embodiment of a cutting element 400 is shown. Cutting element 400 includes a substrate 402 and an ultrahard layer 404 on the substrate 402. Whereas a PDC cutting element may include an ultrahard layer that covers the entirety of the upper surface of the substrate (such that the working surface of the cutting element is entirely ultrahard material as shown in FIG. 1-2), a cutting element of some embodiments of the present disclosure includes an ultrahard layer 404 that has a smaller cross-sectional area than the substrate 402 such that both substrate 402 and ultrahard layer 404 form the working surface 406 of the cutting element 400. Working surface 406 is non-planar in the illustrated embodiment. There is no limitation on the shape of the non-planar working surface 406. In the illustrated embodiment, non-planar working surface 406 is pointed and forms a parabolic cylinder having planar sides with a peak apex 408 extending from one side of the cutting element to the other, and the working surface 406 decreasing in height extending laterally away from the apex 408 (such decreasing lateral portions of the working surface optionally being planar rather than being curved). However, the ultrahard layer 404 does not form the entire surface. In this embodiment, the ultrahard layer 404 forms at least a portion of, and potentially the entire, cutting edge (at the intersection of the apex 408 and the peripheral edge 410 of the cutting element), and extends radially inward towards a central axis 401 of the cutting element 400. As shown in FIGS. 9-1 to 9-4 and discussed in further detail below, the ultrahard layer 404 does not have to extend the entire diameter of cutting element 400 or even extend as far as the central axis 401. Further, in the embodiment illustrated in FIG. 4-1, the ultrahard layer 404 is an elongated (longer than it is wide) segment that forms the apex 408 and defines the cutting edge, extending from the cutting edge on a first side of the cutting element to a second side. The substrate 402 extends along both lateral sides of the elongated segment. As a result, the peripheral edge 410 of the non-planar working surface 406 (formed at the intersection between the non-planar working surface 406 and the cylindrical side surface 412 of the cutting element) has at least one substrate portion and at least one ultrahard layer portion. The substrate portion extends away from the cutting edge formed of the ultrahard layer 404. In the illustrated embodiment, the peripheral edge 410 includes two substrate portions and two ultrahard layer portions.

To increase the surface area of the interface between ultrahard layer 404 and substrate 402, the elongated segment of ultrahard layer 404 may have varying dimensions along its length. For example, as shown in FIG. 4-1 (and FIG. 4-2, showing the substrate 402 and interface surface 403 without the ultrahard layer 404), the ultrahard layer 404 can be elongated segment that is wider at its ends (adjacent the cutting edge 410) than at a radially interior portion (such as, proximate the central axis 401) of the elongated segment. For example, as shown in FIG. 4-4 (a side view of the cutting element 400 of FIG. 4-1), a width w of the elongated segment, at its end, may range from about 60% to about 80% of the diameter of the cutting element. However, other ranges may be desired depending on the depth of cut for a particular drilling application to ensure diamond surface coverage, manufacturing capabilities, exposure on a downhole tool, or other factors. For a 16 mm cutter, for example, such width w may range from about 0.400 in. (10.2 mm) to about 0.500 in. (12.7 mm).

Additionally, as shown in FIG. 4-3 (showing a cross-sectional view of the cutting element 400 of FIG. 4-1), the ultrahard layer 404 formed as an elongated segment (or multiple portions that collectively define an elongated segment) may also be axially thicker at its ends adjacent cutting edge than a radially interior portion proximate the central axis 401. In an embodiment, at its thinnest, ultrahard layer 404 has a thickness t1 ranging from about 0.030 to about 0.150 in. (0.76 to 3.81 mm). However, depending on the cutting element size, this thickness may vary. Thus, for example, in one or more embodiments, the ultrahard layer 404 has, at its thinnest, a thickness t1 that ranges from about 4% to 40% of the cutting element outer diameter. Further, one skilled in the art would appreciate that this thickness may be for embodiments extending through the central axis

401, whereas the embodiment illustrated in FIGS. 9-1 to 9-4 with a discontinuous ultrahard layer has a minimum thickness of zero at the central axis.

Further, the ultrahard layer 404 of FIG. 4-3 has a thickness t2 measured from the cutting edge to the substrate 402. The thickness t2 is measured in the cross-section along the line bisecting the angle formed between the working surface 406 and the side surface 412 of the cutting element 400. In some embodiments, the thickness t2 ranges from about 0.120 to about 0.180 in. (3.05 to 4.57 mm). In one or more embodiments, the thickness t2 ranges from about 10% to about 40% of the outer diameter of the cutting element 400.

In addition to having a non-planar working surface, the cutting element 400 may also have a non-planar interface surface 403 between substrate 402 and ultrahard layer 404, as shown in FIGS. 4-2 and 4-3. Specifically, non-planar interface surface 403 of the illustrated embodiment is formed from at least one groove 405 formed in upper surface of substrate 402. In one or more embodiments, the groove 405 has an elongated (longer than it is wide) shape to receive an elongated segment of ultrahard layer 404. Further, along the length of the elongated groove 405 (shown in the cross-sectional view of FIG. 4-3), the substrate 402 may have a generally convex curvature, which may be generally parabolic in the cross-section corresponding to the length of the groove so that the ends of the elongated segment of ultrahard layer 404 are thicker than a radially inward portion. In one or more embodiments, the groove 405 has a varying radius of curvature along its length, which may result in the varying width of the elongated segment of ultrahard layer 404. For example, as apparent in FIG. 4-3, groove 405 may have its smallest radius of curvature proximate the central axis 401 or mid-line (the cross-sectional plane bisecting the elongated curve and on which the central axis lies) and its largest radius of curvature at the intersection with (or proximate) the side surface 412. The ratio between the largest radius of curvature and the smallest radius of curvature may between 200:0.01 and 1:0.99 or between 200:1 and 1:0.9 or may be less than 100:1, 50:1, 25:1, 10:1, 5:1, or 3.5:1 and/or at least 1.5:1, 2:1, or 2.5:1.

Figures 1, 5:
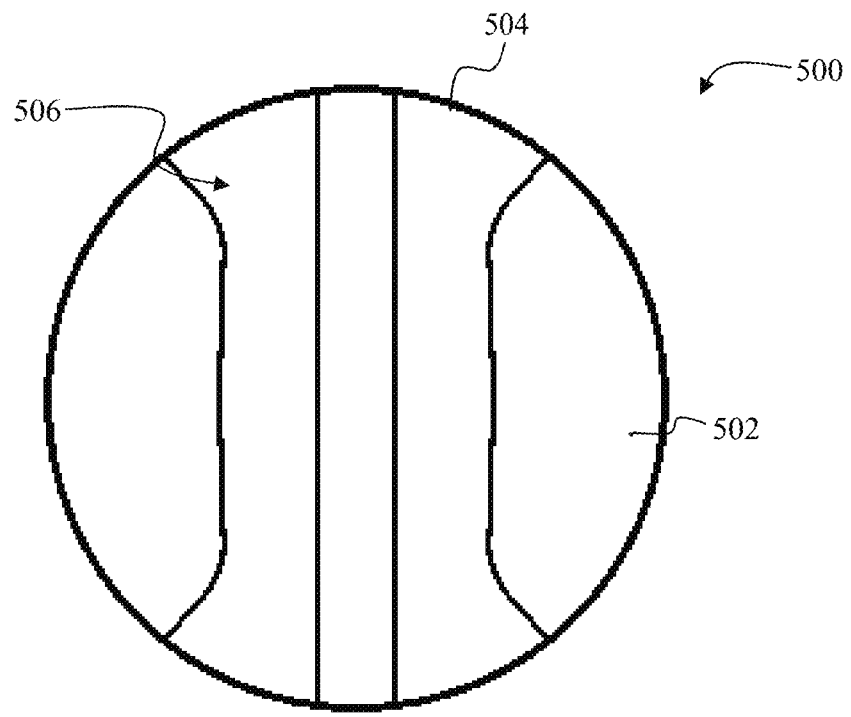
Figures 2, 5:
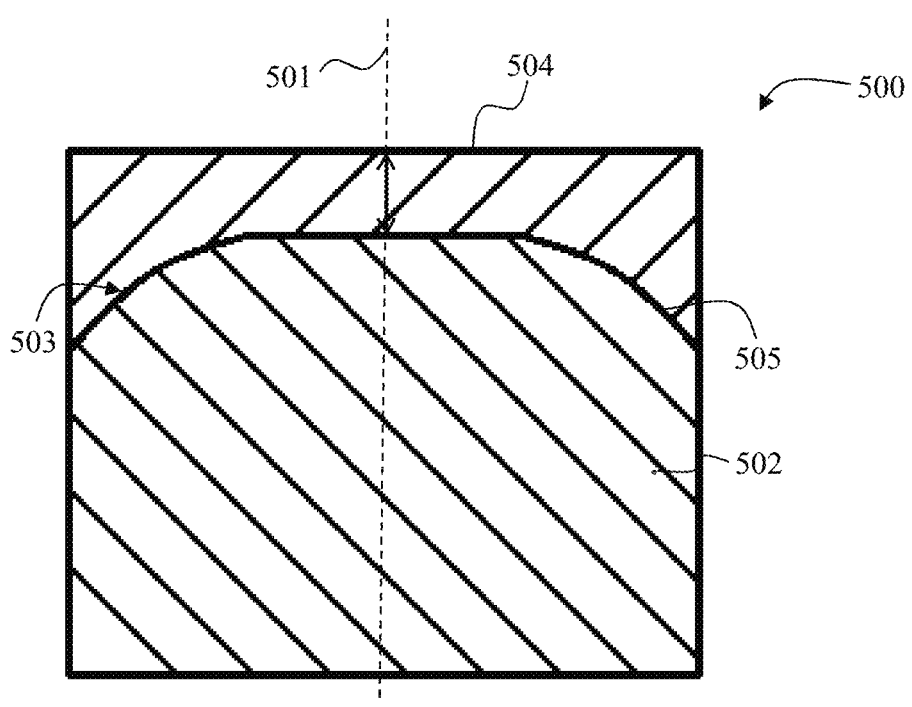
Figures 3, 5:
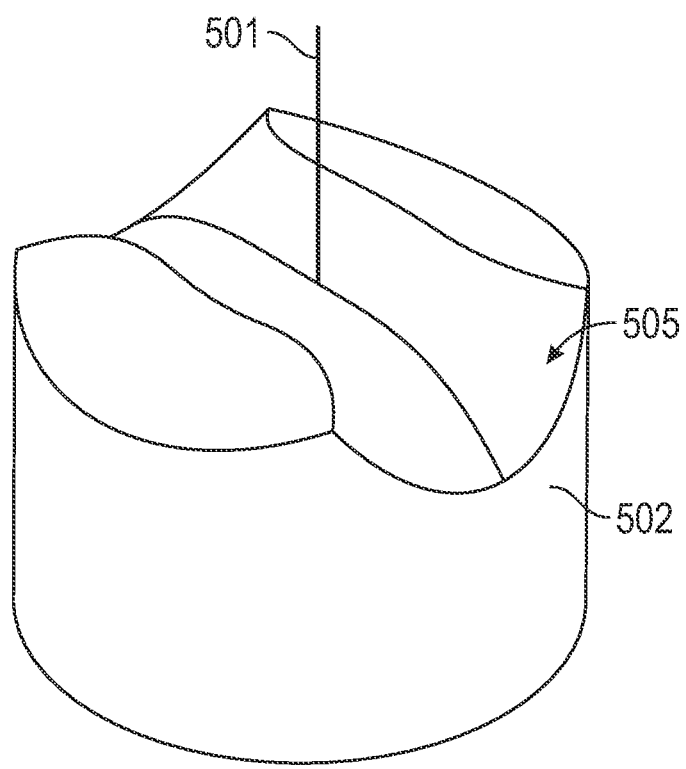

Referring now to FIGS. 5-1 to 5-3, another embodiment of a cutting element is shown. As shown, cutting element 500 includes a substrate 502 and an ultrahard layer 504 on the substrate 502. The cutting element has a non-planar working surface 506 formed by both substrate 502 and ultrahard layer 504 such that the ultrahard layer 504 is an elongated segment, similar to that in FIG. 4-1. Like the embodiment in FIG. 4-1, the elongated segment of ultrahard layer 504 sits within a groove 505 in the substrate 502, and has a varying radius of curvature along the length of the elongated segment. However, unlike the embodiment of FIG. 4-1—where the smallest radius of curvature is proximate the central axis—the smallest radius of curvature of the ultrahard layer 504 may be between the central axis and the radially outward ends of the elongated segment of the ultrahard layer 504. The thickness and width of the elongated segment of ultrahard layer 504 may vary in a similar manner. Thus, in some embodiments, the thickness and/or width of the ultrahard layer 504 has a maximum value at or near the outer radial end of the elongated segment, an intermediate value at the central axis, and a minimum value between the central axis and the outer radial end of the elongated segment.

Additionally, in such embodiments, along the length of the elongated groove 505 (shown in the cross-sectional view of FIG. 5-2), the substrate 502 may have a generally convex curvature, with an optional convex portion at or adjacent the central axis 501. In one or more different embodiments, the smallest radius of curvature along the elongated segment may still lie between the end of the elongated segment and the central axis 501; however, the thickness of the elongated segment of the ultrahard layer 504 may be at its minimum value at or proximate the central axis 501 rather than a point between the end and the central axis 501.

Figures 1, 6:
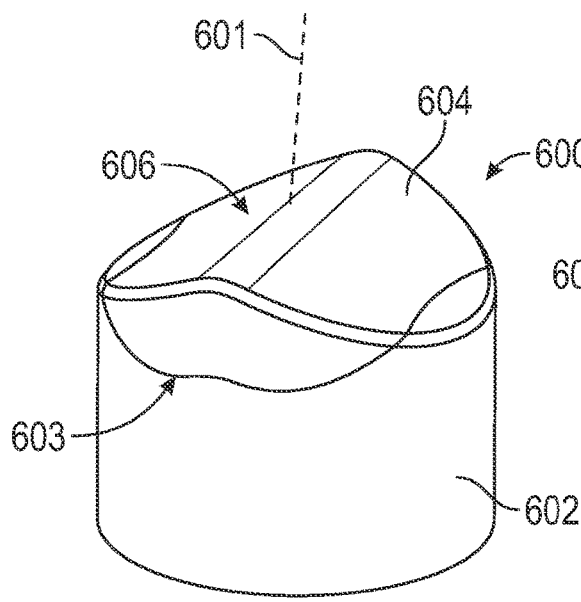
Figures 2, 6:
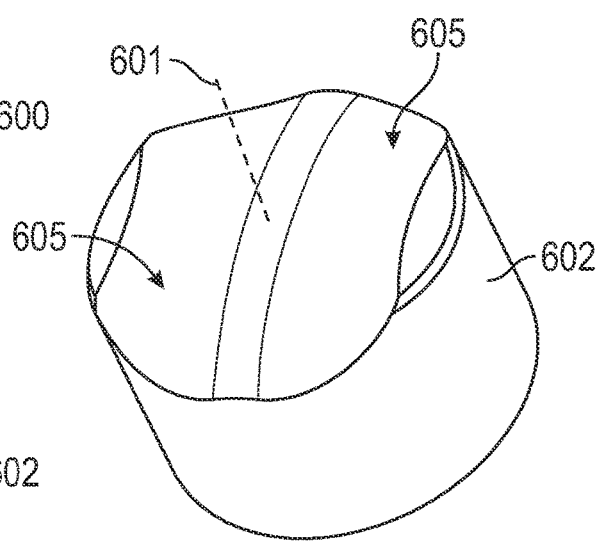
Figures 3, 6:
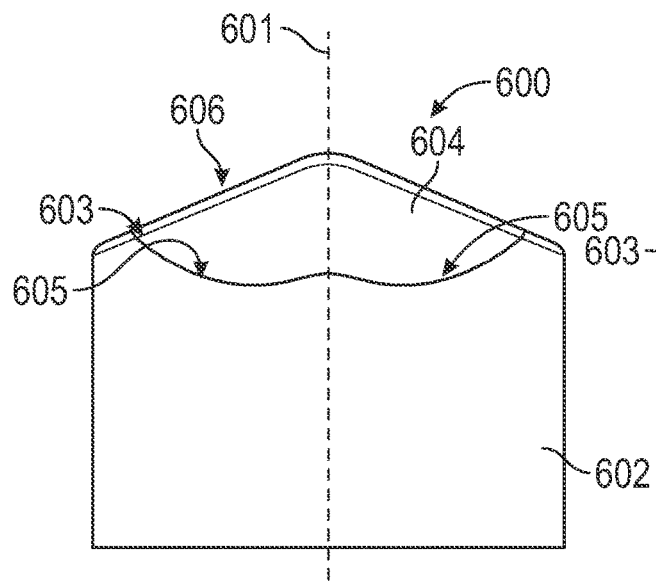
Figures 4, 6:
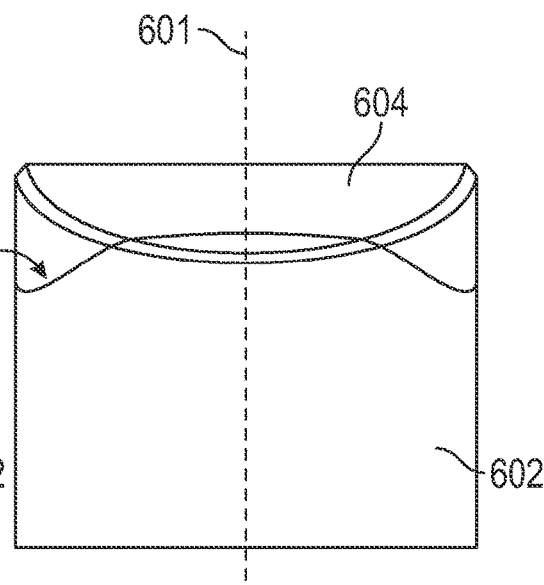

Referring now to FIGS. 6-1 to 6-4, another embodiment of a cutting element is shown. As shown, cutting element 600 includes a substrate 602 and an ultrahard layer 604 on the substrate 602. The cutting element has a non-planar working surface 606 formed by both substrate 602 and ultrahard layer 604 such that the ultrahard layer 604 is an elongated segment, similar to that in FIGS. 4-1 to and 5-1. While the above embodiments included a single groove to form a non-planar interface, the embodiment illustrated in FIGS. 6-1 to 6-4 include a plurality of grooves 605 (two, in this embodiment) in the substrate 602 and extending along the length of the elongated segment of ultrahard material 604 to form a non-planar interface 603. Grooves 605 have a varying radius of curvature (varying from a maximum value adjacent the side surface to a minimum value at the mid-line proximate the central axis 601). Further, grooves 605 are substantially parallel to one another. An elongated peak or protrusion of substrate 602 extends between the plurality of grooves 605, also forming a portion of the interface surface 603. Further, along the length of the elongated grooves 605, the substrate 602 may have a generally convex curvature so that the ends of the elongated segment of ultrahard layer 604 are thicker than a radially inward portion.

Referring now to FIGS. 7-1 to 7-4, another embodiment of a cutting element is shown. As shown cutting element 700 includes a substrate 702 and an ultrahard layer 704 on the substrate 702. The cutting element has a non-planar working surface 706 formed by both substrate 702 and ultrahard layer 704 such that the ultrahard layer 704 is an elongated segment, similar to that in FIGS. 4-1 to 6-4. While the above embodiments show grooves that are aligned with the length of the elongated segment to form a non-planar interface, the embodiment illustrate in FIGS. 7-1 to 7-4 includes a first set of grooves 711 aligned with the length of elongated segment and a second set of grooves 713 not aligned with the length of elongated segment to form a non-planar interface 703. In one or more embodiments, the first set of grooves 711 and the second set of grooves may be substantially perpendicular to each other. Further, as illustrated, each set of grooves 711, 713 includes a plurality of parallel grooves (e.g., two parallel grooves 711 and three parallel grooves 713). However, it is also intended that grooves 711, 713 in either direction may include one groove, rather than a plurality or set of grooves, or may include more than two grooves. Each of grooves 711, 713 has a varying radius of curvature along the length thereof. For grooves 711, which extend along the length corresponding to the length of elongated segment, the radius of curvature is at its maximum value adjacent the side surface 712, and decreases moving towards the mid-line (of the elongated segment) proximate the central axis 701, but increases upon intersecting with groove 713-1 that extends along the length of the mid-line. Grooves 713 extend substantially perpendicular to grooves 711. In the illustrated embodiment, groove 713-1 extends within an interior portion of substrate 702 (i.e., not intersecting side surface 712) along the mid-line 707 that bisects the length of grooves 711 and extends through the central axis 701. Additionally, there are two grooves 713-2 that extend substantially parallel to groove 713-1 intersecting side surface 712, at each end corresponding to elongated segment. As mentioned, each of grooves 713 has a varying radius of curvature that has a maximum value at the ends thereof, and a minimum value between grooves 711.

Figures 1, 8:
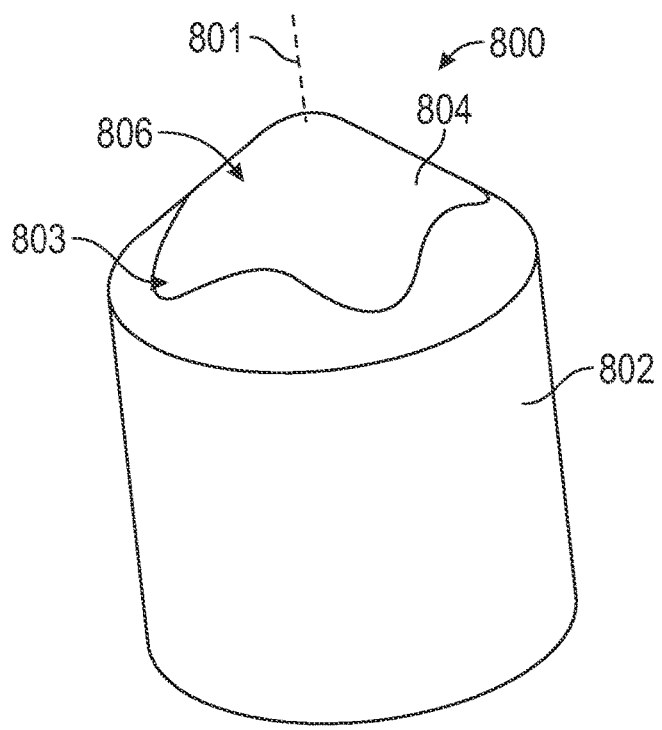
Figures 2, 8:
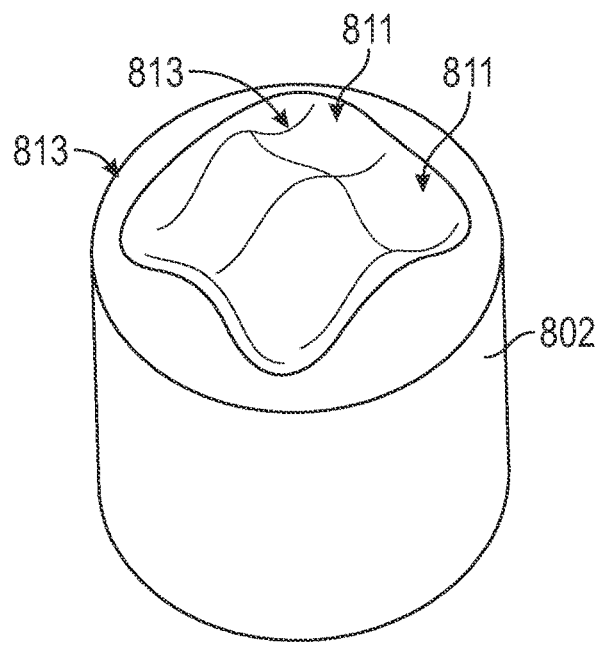
Figures 3, 8:
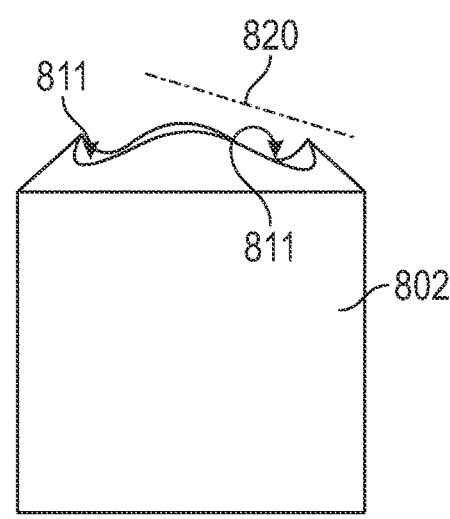

Referring now to FIGS. 8-1 to 8-3, another embodiment of a cutting element is shown. As shown cutting element 800 includes a substrate 802 and an ultrahard layer 804 on the substrate 802. The cutting element 800 has an axisymmetric non-planar working surface 806 formed by both substrate 802 and ultrahard layer 804. However, unlike embodiments which have a non-planar working surface that is generally shaped to be a parabolic cylinder, the embodiment illustrated in FIGS. 8-1 to 8-3 includes a substantially conical non-planar working surface 806 terminating in a rounded apex. The substantially conical non-planar working surface 806 includes a cutting tip formed of the ultrahard layer 804 surrounded by substrate 802. Whereas a substantially conical cutting element could have the entire conical surface formed of ultrahard material (and in some cases including an ultrahard material forming a portion of a cylindrical side surface), the substrate 802 according to the present illustrated embodiment forms a portion of the substantially conical surface.

Unlike other embodiments disclosed herein, ultrahard layer 804 is not an elongated segment; however, it still has lateral support by substrate 802 by virtue of the non-planar interface 803 therebetween. As illustrated, this lateral support results in a wavy pattern of the interface 803 at the working surface 806. The peaks of the substrate may be designed to avoid being engaged with the formation at a particular depth of cut, for a given cutting element backrake (angle between cutting element relative to a line perpendicular to the formation to be engaged), and as illustrated in FIG. 8-3, having the plane 820 for a 15-20° (e.g., 17°) backrake and a depth of cut between 0.015 and 0.050 in. (0.38 and 1.27 mm), such as 0.025 in. (0.64 mm). The present disclosure is not limited to a 15-20° and a depth of cut of between 0.015 and 0.050 in. (0.38 and 1.27 mm), and thus, the thickness may vary depending on the depth of cut and backrake to avoid or minimize the substrate being engaged with the formation.

Non-planar interface 803 is formed by two sets of grooves 811, 813, each set having two grooves and the two sets being substantially perpendicular to each other. Each of grooves 811, 813 are substantially the same length, giving rotational as well as bit lateral symmetry to the ultrahard layer 804. Further, each of grooves 811, 813 has a varying radius of curvature, with maximum values at the ends and minimum values at the mid-length of grooves 811, 813. While two sets of grooves 811, 813 are illustrated, it is also intended that a single set of grooves could instead be used in some embodiments.

While some ultrahard layers extend the entire diameter of the cutting element, the present disclosure is not so limited. For instance, as shown in FIGS. 9-1 to 9-4, cutting element 900 includes a substrate 902 and an ultrahard layer 904 on substrate 902. The cutting element has a non-planar working surface 906 formed by both substrate 902 and ultrahard layer 904; however, ultrahard layer 904 does not form an elongated segment extending across the entire length of the cutting element diameter, but rather is a discontinuous layer or layer with two discrete segments with a portion of substrate 902 therebetween. Thus, an interior portion of the crest 910 (which extends from the cutting edge to the other side of the cutting element) is formed of substrate 902, including at the central axis. However, the ultrahard layer 904 may form at least 50% of the length of crest 910. Similar to as described for FIG. 4-1, each segment of ultrahard layer 904 may have varying dimensions along its length. Specifically, each segment of ultrahard layer 904 may be wider at its ends (adjacent cutting edge) than a radially interior portion of the segment, and as shown in the side view of FIG. 9-3, may have a width ranging from about 60% to 80% of the diameter of the cutting element. However, other ranges may be desired depending on the depth of cut for a particular drilling application to ensure diamond surface coverage, based on manufacturing or assembly capabilities, or for other reasons.

Additionally, as shown in FIG. 9-4, each segment of ultrahard layer 904 may have a varying thickness. Specifically, each segment of ultrahard layer 904 may have a thickness t3 at the periphery ranging from about 0.030 to about 0.150 in. (0.76 to 3.81 mm), which may be from about 4% to about 40% of the cutting element outer diameter. Each segment may also include a peak thickness t4 which can be anywhere between the outer diameter (OD) of the cutter and the center axis of the cutter and range from about 0.050 to about 0.180 in. (1.27 to 4.57 mm), which may be from about 8% to about 45% of the cutting element outer diameter. In addition to having a non-planar working surface, the interface surface 903 between substrate 902 and ultrahard layer 904 is also non-planar. Specifically, non-planar interface surface 903 may be formed from two concavities 905 on either side of the cutting element. Each concavity 905 may include one, two, or more grooves 907. Where multiple grooves are used, the grooves 907 are optionally parallel or perpendicular. The portion of the concavity 905 apart from the grooves 907 may define the rest of the non-planar interface 903.

Figures 1, 10:
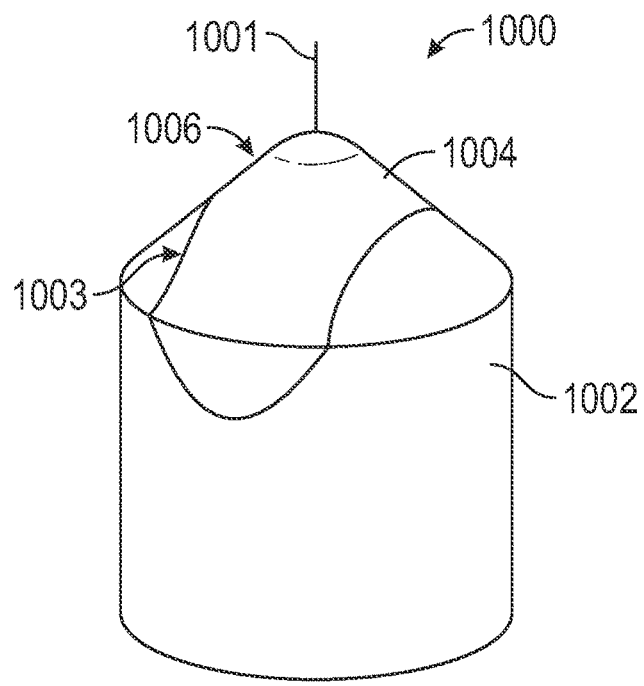
Figures 2, 10:
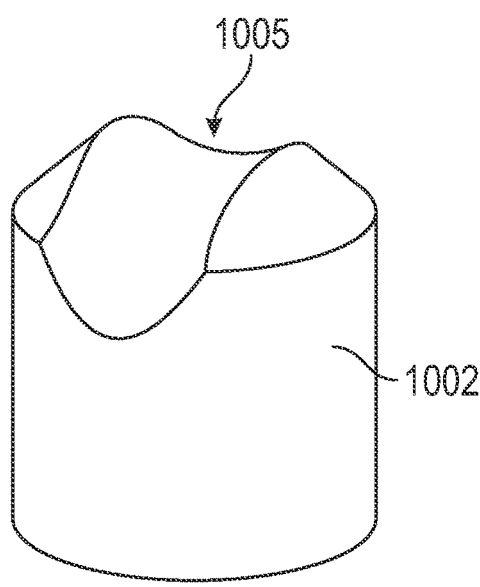
Figures 3, 10:
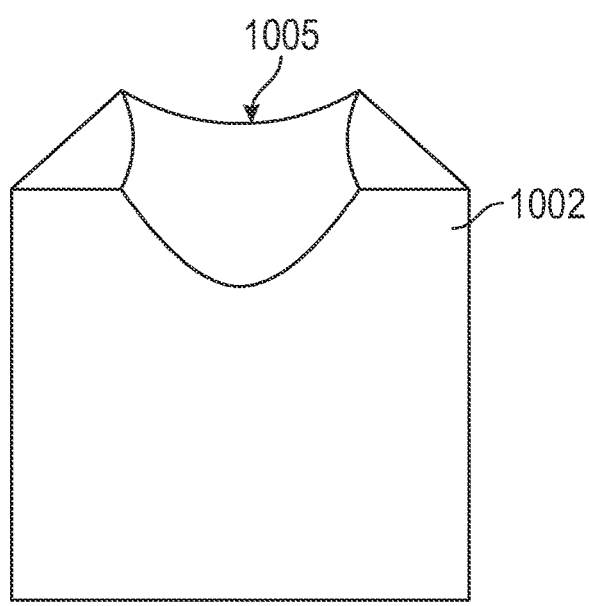
Figures 4, 10:
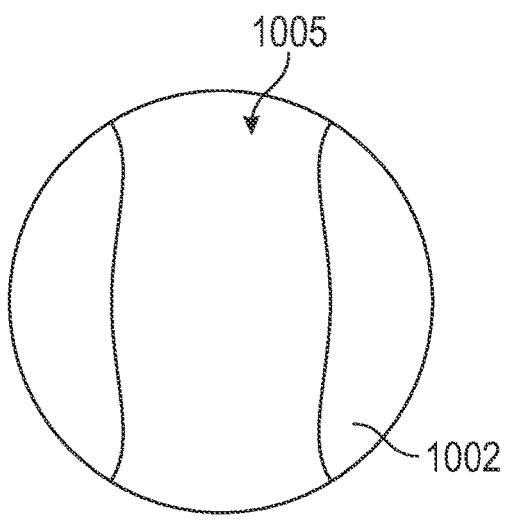

Referring now to FIGS. 10-1 to 10-4, another embodiment of a cutting element is shown. As shown cutting element 1000 includes a substrate 1002 and an ultrahard layer 1004 on the substrate 1002. The cutting element 1000 has an axisymmetric non-planar working surface 1006 formed by both substrate 1002 and ultrahard layer 1004. Similar to the embodiment illustrated in FIGS. 8-1 to 8-3, the cutting element in FIGS. 10-1 to 10-4 includes a substantially conical non-planar working surface 1006 terminating in a rounded apex. The substantially conical non-planar working surface 1006 includes a cutting tip formed of the ultrahard layer 1004 surrounded by substrate 1002. Whereas a conical cutting element could have the entire conical surface formed of ultrahard material (and in fact, an ultrahard material may form a portion of a cylindrical side surface), the substrate 1002 according to the present embodiment forms a portion of the substantially conical surface (and a portion of the cylindrical side surface). Unlike the embodiments illustrated above in FIGS. 8-1 to 8-3, ultrahard layer 1004 is an elongated segment and has lateral support by substrate 1002. Because ultrahard layer 1004 is an elongated segment, it extends, in one direction, to the cylindrical portion of the cutting element, but not in the perpendicular direction, thus forming a segment that is longer than it is wide. Further, it is also intended that the ultrahard layer 1004 may be elongated without reaching the cylindrical portion (i.e. outer diameter of the cutting element) but still be longer than it is wide.

The elongated segment of ultrahard layer 1004 may have varying dimensions along its length. The ultrahard layer 1004 as an elongated segment may be wider at its ends (adjacent cylindrical portion) than a radially interior portion, but as illustrated, the width proximate the central axis 1001 may also be greater than the smallest width. In one or more embodiments, the groove 1005 may have a varying radius of curvature along its length, which may result in the varying width of the elongated segment of ultrahard layer 1004.

A non-planar interface surface 1003 may be formed from at least one groove 1005 formed in upper surface of substrate 1002. In one or more embodiments, the groove 1005 may have an elongated (longer than it is wide) shape to receive an elongated segment of ultrahard layer 1004. Further, along the length of the elongated groove 1005 (shown in the perspective view of FIG. 10-2), the substrate 1002 may have a generally convex curvature, which may be generally parabolic (in the cross-section corresponding to the length of the groove).

Referring now to FIGS. 11-1 to 11-4, another embodiment of a cutting element is shown. As shown cutting element 1100 includes a substrate 1102 and an ultrahard layer 1104 on the substrate 1102. The cutting element 1100 has an axisymmetric non-planar working surface 1106 formed by both substrate 1102 and ultrahard layer 1104. Similar to the embodiments illustrated in FIGS. 8-1 to 8-3 and 10-1 to 10-4, the cutting element in FIGS. 11-1 to 11-4 includes a substantially conical non-planar working surface 1106 terminating in a rounded apex. The substantially conical non-planar working surface 1106 includes a cutting tip formed of the ultrahard layer 1104 surrounded by substrate 1102. Whereas a conventional substantially conical cutting element has the entire conical surface formed of ultrahard material (and in fact, an ultrahard material may form a portion of a cylindrical side surface), according to the present illustrated embodiment, the substrate 1102 forms a portion of the substantially conical surface. Unlike the embodiments illustrated above in FIGS. 8-1 to 8-3, and similar to the embodiment illustrated in FIGS. 10-1 to 10-4 ultrahard layer 1104 is an elongated segment and has lateral support by substrate 1102. Because ultrahard layer 1104 is an elongated segment, it extends, in one direction, to the cylindrical portion of the cutting element, but not in the perpendicular direction, thus forming a segment that is longer than it is wide. Further, it is also intended that the ultrahard layer 1104 may be elongated without reaching the cylindrical portion (i.e. outer diameter of the cutting element) but still be longer than it is wide. As illustrated, ultrahard layer 1104 reaches the cylindrical portion (i.e., the other diameter of the cutting element) at one end of the elongated segment, but does not extend to the cylindrical portion at the other end.

The elongated segment of ultrahard layer 1104 may have varying dimensions along its length. The ultrahard layer 1104 as an elongated segment may be wider at its ends (adjacent or proximate cylindrical portion) than a radially interior portion, but the width proximate the central axis 1101 may also be greater than the smallest width or the width proximate the central axis 1101 may be the smallest width. In one or more embodiments, the groove 1105 may have a varying radius of curvature along its length, which may result in the varying width of the elongated segment of ultrahard layer 1104.

A non-planar interface surface 1103 may be formed from at least one groove 1105 formed in upper surface of substrate 1102. In one or more embodiments, the groove 1105 may have an elongated (longer than it is wide) shape to receive an elongated segment of ultrahard layer 1104. Further, along the length of the elongated groove 1105 (shown in the perspective view of FIG. 10-2), the substrate 1102 may have a generally convex curvature, which may be generally parabolic (in the cross-section corresponding to the length of the groove).

In addition to the geometries shown in FIGS. 2-1 to 2-3 and FIGS. 4-1 to 7-4, other shaped non-planar working surfaces may be used, including other axisymmetric non-planar working surfaces that do not have a conical surface, but instead may have a generally convex or concave surface that terminates in a rounded apex. Further, other non-planar working surface may include other types of symmetry, such as bilateral symmetry (an example of which is shown in the embodiments of FIGS. 4-1 to 7-4) or rotational symmetry, as well as asymmetric working surfaces. In any of such non-planar working surfaces, the substrate may define a portion of the non-planar working surface so that the ultrahard layer provides desired thickness in the portion of the cutting element that engages with the formation during drilling and the substrate provides lateral support to the ultrahard layer in a region that is designed to not engage with the formation during drilling.

In the case of a conical or other axisymmetric non-planar working surface cutting element, the backrake angle may be the angle between the cutting element axis and the line perpendicular to the formation to be engaged, whereas in the case of a cutting element as shown in FIGS. 2-1 to 2-3 and FIGS. 4-1 to 7-4, the backrake may be calculated between a line extending from the cutting tip across the diameter of the cutting element and the line perpendicular to the formation to be engaged. In one or more embodiments, the cutting element of FIG. 8-2 may have a backrake angle ranging from about −30° to 30°; however, it is also envisioned that a greater backrake, up to 80° may also be used. In one or more embodiments, the cutting elements of FIGS. 2-1 to 2-3 and FIGS. 4-1 to 7-4 may have a backrake ranging from about 0° to −20°.

Figure 12:
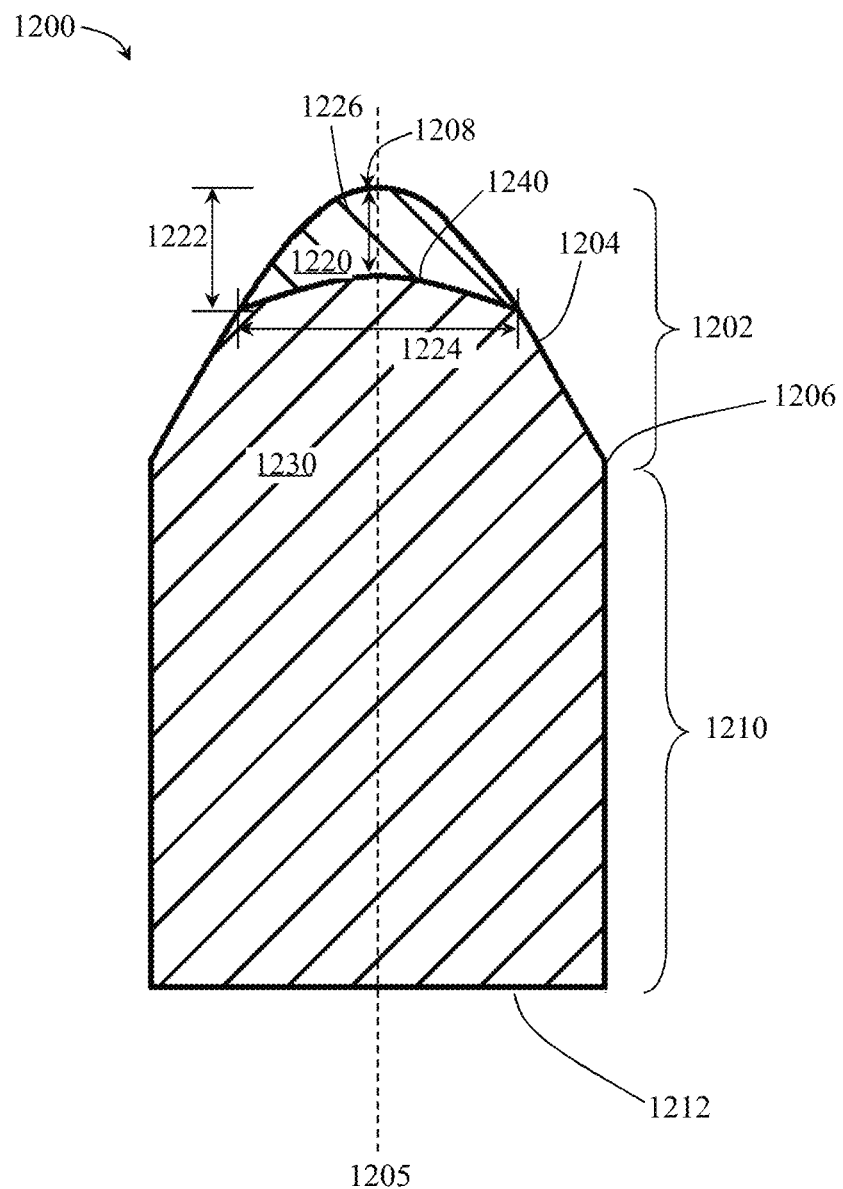
FIG. 12 is a cross-sectional view of a non-planar cutting element according to embodiments of the present disclosure.
Figure 14:
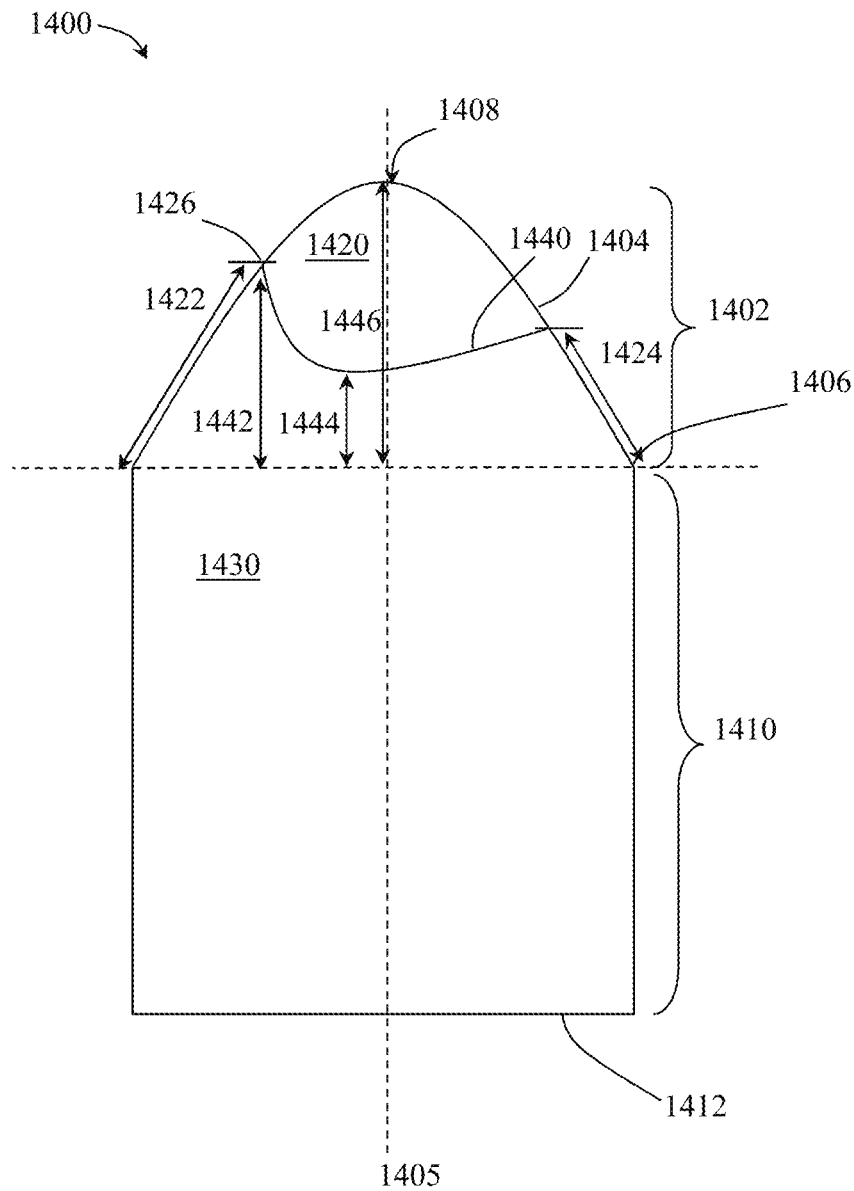
FIG. 14 is a cross-sectional view of a non-planar cutting element according to embodiments of the present disclosure.

Referring now to FIG. 12, a pointed cutting element 1200 includes a pointed region 1202 having a side surface 1204 extending from a pointed region outer perimeter 1206 to a rounded peak 1208. Pointed cutting element 1200 also includes a base region 1210 extending a depth along the longitudinal axis 1205 from the pointed region outer perimeter 1206 to a base surface 1212 of the cutting element 1200 opposite the rounded peak 1208. An ultrahard material body 1220, such as a diamond body, forms a portion of the pointed region 1202 including the rounded peak 1208. The ultrahard material body 1220 is axisymmetric around the longitudinal axis 1205 (extending centrally through the cutting element along its length). However, in other embodiments, an ultrahard material body may be non-axisymmetric about the longitudinal axis (e.g., as shown in FIG. 14) or may be offset from the longitudinal axis. For example, in some embodiments, an ultrahard material body may be offset in a direction of cutting; in some embodiments, an ultrahard material body may have a relatively greater thickness on a side of the cutting element facing in the direction of cutting; and in some embodiments, an ultrahard material body may have a symmetric size and shape around a peak of a cutting element, where the peak is not aligned with the cutting element's longitudinal axis.

Figures 1, 15:
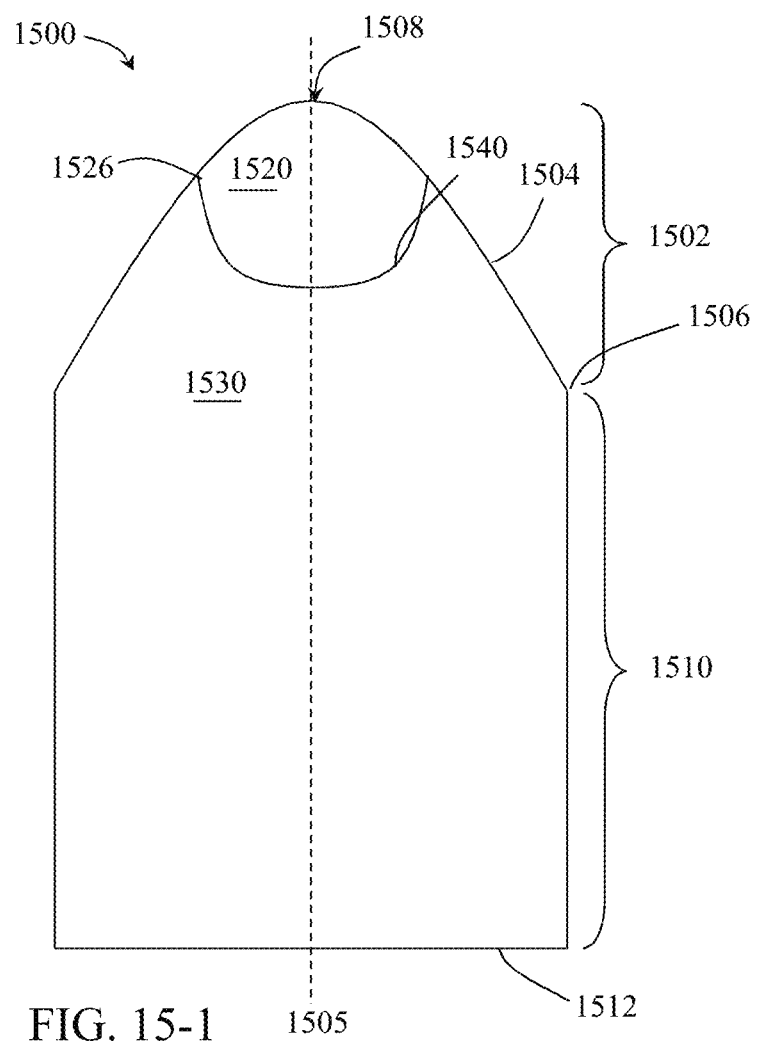
Figures 2, 15:
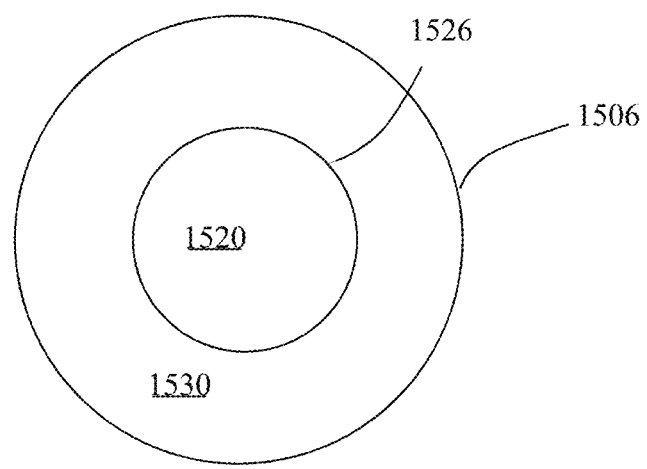

Further, the ultrahard material body 1220 is disposed on a substrate 1230 at a non-planar interface 1240, where the substrate 1230 forms a portion of the pointed region 1202 and the entire base region 1210. The non-planar interface 1240 has a generally convex shape, having a curvature larger than the curvature of the rounded peak 1208. Other embodiments may have differently shaped non-planar interfaces, including axisymmetrically or non-axisymetrically shaped non-planar interfaces, or planar interfaces formed between the ultrahard material body and substrate. Further, the shape of a non-planar interface may generally correspond with the shape of the outer surface of the ultrahard material body (such as shown in FIG. 12), or the shape of the interface may be different from the shape of the outer surface of the ultrahard material body (such as shown in FIGS. 14 to 15-2).

The ultrahard material body has a height 1222 defined between two points of the ultrahard material body having the greatest distance apart along a dimension parallel with the longitudinal axis 1205 of the cutting element 1200 and a width 1224 defined between two points of the ultrahard material body having the greatest distance apart along a dimension perpendicular to the longitudinal axis 1205. According to embodiments of the present disclosure, the height to width aspect ratio of an ultrahard material body may be greater than ¾ or greater than 1/1. In some embodiments, the height to width aspect ratio of an ultrahard material body may be approximately 1/1.

The height 1222 of the ultrahard material body 1220 measured between two points of the ultrahard material body having the greatest distance apart along a dimension parallel with the longitudinal axis may be at least 0.1 in. (2.54 mm). According to some embodiments, an ultrahard material body has a height at the highest point of its peak within a range having a lower limit, an upper limit, or lower and upper limits including any of 0.1 in. (2.54 mm), 0.15 in. (3.81 mm) or 0.2 in. (5.08 mm) 0.3 in. (7.62 mm), 0.4 in. (10.16 mm), or any values therebetween. The thickness 1226 of the ultrahard material body measured at the thickest part of the ultrahard material body (e.g., shown at the peak 1208 in FIG. 12) along a dimension parallel with the longitudinal axis may be at least 0.1 in. (2.54 mm). According to some embodiments, the ultrahard material body 1220 has a thickness equal to the height 1222.

Figures 1, 13:
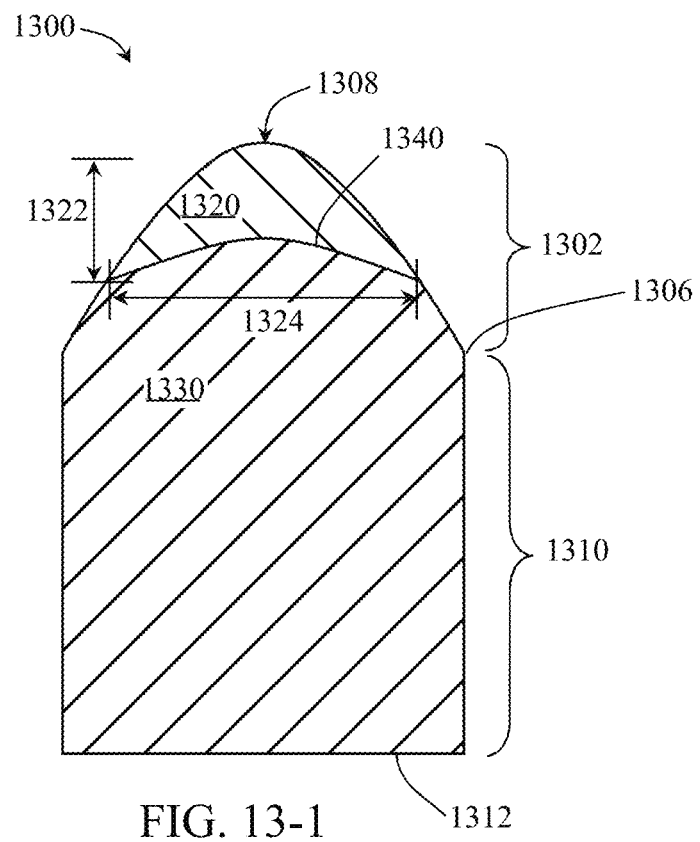
Figures 2, 13:
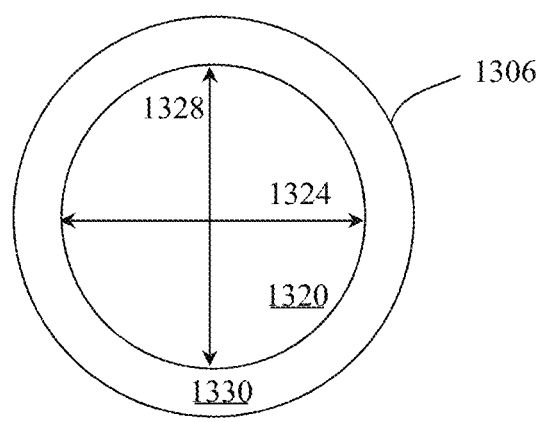

FIGS. 13-1 and 13-2 show a cross-sectional side view and a top view, respectively, of a non-planar cutting element according to embodiments of the present disclosure. The cutting element 1300 has a pointed region 1302 extending a height from a pointed region outer perimeter 1306 to a peak 1308 and a base region 1310 extending a depth from the pointed region outer perimeter 1306 to a base surface 1312. A diamond body 1320, forming a portion of the pointed region 1302, is disposed on a substrate 1330 at a non-planar interface 1340, where the substrate 1330 forms the remaining portion of the pointed region 1302 and the entire base region 1310. In other embodiments, one or more transition layers may be disposed between a diamond body and a substrate. The diamond body 1320 has a height 1322 defined between two points of the ultrahard material body having the greatest distance apart along a dimension parallel with the longitudinal axis of the cutting element 1300, a first width 1324 defined between two points of the ultrahard material body having the greatest distance apart along a first dimension perpendicular to the longitudinal axis, and a transverse width 1328 defined between two points of the ultrahard material body 1320 having the greatest distance apart along a second dimension perpendicular to both the first dimension and the longitudinal axis. According to embodiments of the present disclosure, ratio of the first width 1324 to the transverse width 1328 may be less than or equal to 2. According to some embodiments, the height 1322 may be greater than or equal to the first width 1324 and the first width may be greater than or equal to the transverse width 1328.

Referring now to FIG. 14, a cross-sectional view of a pointed cutting element 1400 according to embodiments of the present disclosure is shown. The cutting element 1400 has a pointed region 1402 having a side surface 1404 extending a height from a pointed region outer perimeter 1406 to a rounded peak 1408 and a base region 1410 extending from the pointed region outer perimeter 1406 to a base surface 1412. The base region 1410 has a uniform circular cross section along its depth from the pointed region outer perimeter 1406, such that the base region has a cylindrical shape. In other embodiments, the base region may have a different shape (e.g., a non-circular uniform cross-sectional shape extending its entire depth or a uniform cross-sectional shape extending a partial depth from the pointed region outer perimeter).

An ultrahard material body 1420 is positioned a distance from the base region 1410 and forms a portion of the pointed region 1402, including the rounded peak 1408. The distance (e.g., 1442, 1444) between the ultrahard material body 1420 and the base region 1410 may be measured along a dimension parallel with the longitudinal axis 1405 of the cutting element, from the ultrahard material body 1420 to the base region 1410 (i.e., from the ultrahard material body 1420 to a plane intersecting the pointed region outer perimeter 1406). According to some embodiments, the distance (e.g., 1442, 1444) between the ultrahard material body and the base region may be within a range having a lower limit, an upper limit, or lower and upper limits including any of 10%, 20%, 30%, 40%, 50%, or 60% of the height 1446 of the pointed region, where the height 1446 of the pointed region is the distance between the peak 1408 and the pointed region outer perimeter 1406 along a dimension parallel with the longitudinal axis 1405.

In embodiments having a non-planar interface between the ultrahard material body and substrate, the distance between the ultrahard material body and the base region may vary along the non-planar interface. The greatest distance between the ultrahard material body and base region may be greater than the smallest distance between the ultrahard material body and base region, for example, by more than 1%, more than 5%, or more than 10% of the smallest distance. For example, as shown in FIG. 14, the ultrahard material body 1420 is on the substrate 1430 at a non-planar interface 1440. The cutting element has a greatest distance 1442 between the ultrahard material body 1420 (at the non-planar interface 1440) and the base region 1410 along a dimension parallel with the cutting element longitudinal axis 1405 and a smallest distance 1444 between the ultrahard material body (at a different position along the non-planar interface 1440) and the base region 1410 along the dimension parallel with the longitudinal axis 1405.

In some embodiments, the distance between an ultrahard material body and a base region of a non-planar cutting element is measured along the side surface of the non-planar cutting face, from the base region (at the pointed region outer perimeter) to the outer perimeter of the ultrahard material body. In some embodiments, the distance between the ultrahard material body outer perimeter and the base region at the pointed region outer perimeter varies around the ultrahard material body outer perimeter, where the interface between the ultrahard material body and substrate (or between the ultrahard material body and transition layer) may be planar or non-planar. In some embodiments, the distance between the ultrahard material body outer perimeter and the base region at the pointed region outer perimeter is constant around the ultrahard material body outer perimeter, where the interface between the ultrahard material body and substrate (or between the ultrahard material body and transition layer) may be planar or non-planar.

In the embodiment shown in FIG. 14, the ultrahard material body 1420 has an outer perimeter 1426 extending around the side surface 1404 of the cutting element 1400, where the ultrahard material body outer perimeter 1426 is at the interface between the side surface of the ultrahard material body 1420 and the side surface of the substrate 1430. The distance between the ultrahard material body outer perimeter 1426 and the base region 1410 at the pointed region outer perimeter 1406 varies around the ultrahard material body outer perimeter 1426, including a first distance 1422 between the ultrahard material body outer perimeter 1426 and the pointed region outer perimeter 1406 and a second distance 1424 between the ultrahard material body outer perimeter 1426 and the pointed region outer perimeter 1406, opposite the first distance 1422, where the first distance 1422 is greater than the second distance 1424. The distance between the ultrahard material body outer perimeter 1426 and the pointed region outer perimeter 1406 may gradually decrease around the ultrahard material body outer perimeter from the first distance 1422 to the second distance 1424, or the distance between the ultrahard material body outer perimeter 1426 and the pointed region outer perimeter 1406 may vary inconsistently around the ultrahard material body outer perimeter between the first distance 1422 and the second distance 1424. For example, the distance between the ultrahard material body outer perimeter 1426 and the pointed region outer perimeter 1406 may vary in a manner following the cross-sectional shape of the non-planar interface 1440 shown in FIG. 14 around the ultrahard material body outer perimeter between the first distance 1422 and the second distance 1424.

Further, in the embodiment shown in FIG. 14, the entire ultrahard material body 1420 is raised (a distance apart) from the base region 1410 of the cutting element 1400, such that the entire outer perimeter 1426 of the ultrahard material body 1420 is a distance apart from the pointed region outer perimeter 1406 and the entire non-planar interface 1440 is a distance apart from the base region 1410. However, in some embodiments, a portion of an ultrahard material body outer perimeter may extend to the cutting element base region, such that a portion of the pointed region outer perimeter is formed of the ultrahard material body and a portion of the pointed region outer perimeter is formed of a substrate. In some embodiments, the entire ultrahard material body outer perimeter may be a distance apart from the pointed region outer perimeter, while a portion of the ultrahard material body extends within the interior of the base region (i.e., an interior portion of a non-planar interface dips below a plane intersecting the pointed region outer perimeter).

Referring now to FIGS. 15-1 and 15-2, cross-sectional and top views, respectively, illustrate another example of a non-planar cutting element according to embodiments of the present disclosure. The cutting element 1500 has a pointed region 1502 extending a height from a base region 1510. The pointed region 1502 has a side surface 1504 extending from a pointed region outer perimeter 1506 to a rounded peak 1508. A substrate 1530 forms the base region and a portion of the pointed region 1502. An ultrahard material body 1520, disposed on the substrate 1530 at a non-planar interface 1540, forms the rounded peak 1508 and a portion of the pointed region side surface 1504.

The ultrahard material body 1520 has an outer perimeter 1526 extending around the pointed region side surface 1504, where the ultrahard material body outer perimeter 1526 is at the interface between the side surface of the ultrahard material body 1520 and the side surface of the substrate 1530. According to embodiments of the present disclosure, the ultrahard material body outer perimeter 1526 may be less than the pointed region outer perimeter 1506 by at least 10%, at least 20%, at least 30%, or at least 40% of the pointed region outer perimeter.

Figure 16:
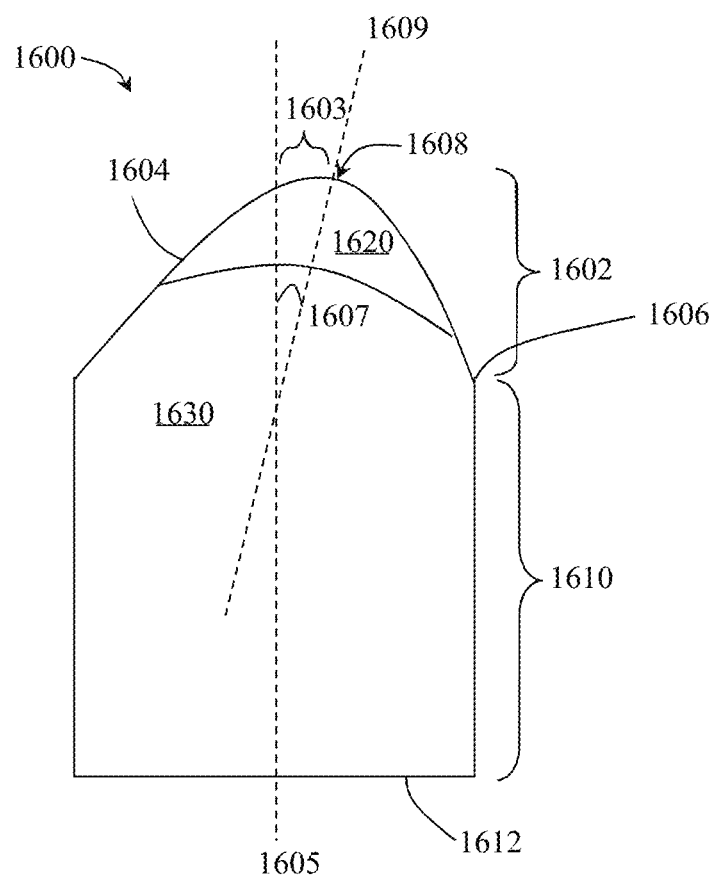
FIG. 16 is a cross-sectional view of a non-planar cutting element according to embodiments of the present disclosure.

FIG. 16 is a cross-sectional view of another example of a non-planar cutting element according to embodiments of the present disclosure. The cutting element 1600 has a pointed region 1602 extending a height from a base region 1610. The pointed region 1602 has a side surface 1604 extending from the pointed region outer perimeter 1606 to a rounded peak 1608, and the base region 1610 has a cylindrical side surface extending from the pointed region outer perimeter 1606 to a base surface 1612 of the cutting element 1600. An ultrahard material body 1620 forms the peak 1608 and a portion of the pointed region side surface 1604. A substrate 1630 forms the remaining portion of the pointed region 1602 and the entire base region 1610. The rounded peak 1608 is offset from a longitudinal axis 1605 extending centrally through the length of the cutting element 1600.

The offset of a peak from a longitudinal axis of a non-planar cutting element may be measured in terms of distance between the peak and the longitudinal axis or in terms of an offset angle formed between the longitudinal axis and a peak axis extending transversely through the peak. For example, as shown in FIG. 16, the peak 1608 may be offset from the cutting element longitudinal axis 1605 by a distance 1603. According to embodiments of the present disclosure, the offset distance 1603 may range from greater than 0% to less than 50% of the radius of the pointed region (i.e., from the longitudinal axis to the pointed region outer perimeter 1606) or to less than 75% the radius of the pointed region. In embodiments having no peak offset, the distance between the peak and the longitudinal axis is zero. Also shown in FIG. 16, the peak 1608 may be offset from the longitudinal axis 1605 at an offset angle 1607 measured between the longitudinal axis 1605 and a peak axis 1609 extending transversely through the center of the peak 1608. According to embodiments of the present disclosure, a peak may be offset from a cutting element longitudinal axis by an offset angle ranging from greater than 0° to less than 45°. In embodiments having no peak offset, the offset angle between the peak axis and the longitudinal axis is zero, or coaxial. In some embodiments, a peak may be offset from the longitudinal axis, where the peak axis is parallel to the longitudinal axis. In such embodiments, the peak is offset a distance from the longitudinal axis, but is not tilted with respect to the longitudinal axis.

Figure 17:
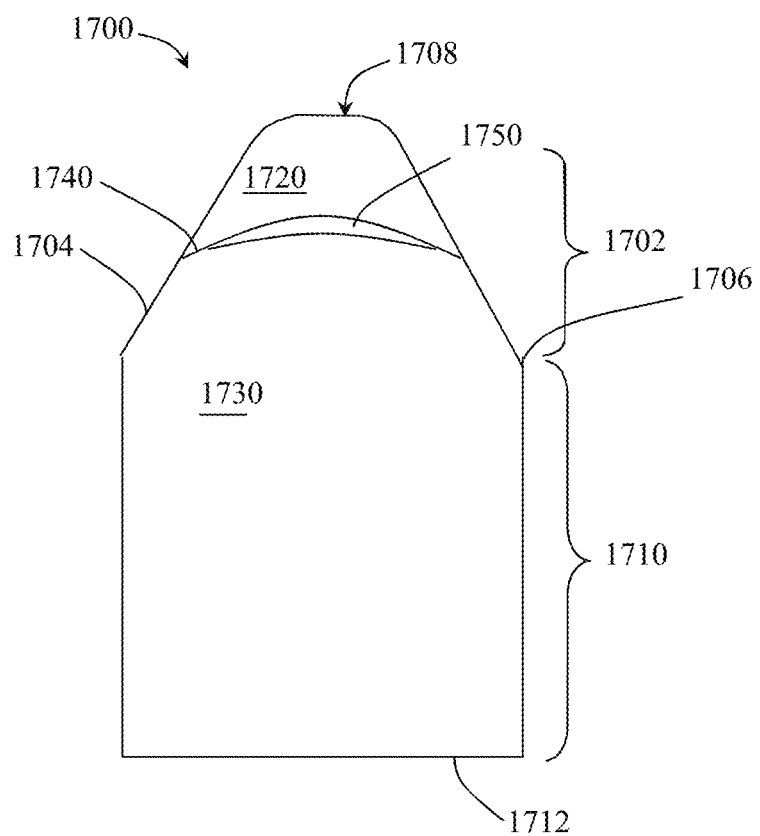
FIG. 17 is a cross-sectional view of a non-planar cutting element according to embodiments of the present disclosure.

FIG. 17 shows a cross-sectional view of another example of a non-planar cutting element according to embodiments of the present disclosure. The cutting element 1700 has a pointed region 1702 extending a height from a base region 1710 to a truncated or flattened peak 1708. The base region 1710 extends from the pointed region outer perimeter 1706 to a base surface 1712 of the cutting element 1700. An ultrahard material body 1720 forms a portion of the pointed region 1702, including the peak 1708. A transition layer 1750 is disposed between the ultrahard material body 1720 and a substrate 1730. The transition layer 1750 is interior to the side surface 1704 of the pointed region 1702, such that an interface 1740 between the ultrahard material body 1720 and the substrate 1730 extends around the transition layer 1750 and outward to the cutting element side surface 1704. The substrate 1730 forms the remaining portion of the pointed region 1702 and the entire base region 1710.

According to embodiments of the present disclosure, a transition layer may be formed of a material having a coefficient of thermal expansion between the coefficient of thermal expansion of the ultrahard material body and the substrate. Suitable transition layer material may include, for example, carbides, borides, nitrides, and/or mixtures of ultrahard material, such as diamond or cubic boron nitride, and transition metal carbide, such as tungsten carbide, borides and/or nitrides. Further, one or more transition layers (e.g., two transition layers, three transition layers, four transition layers or more) may be disposed between an ultrahard material body and a substrate, depending on, for example, the size of the cutting element, the material forming the ultrahard material body and the substrate, and/or the application for which the cutting element is being used. In some embodiments, a transition layer may be formed of a mixture of the material forming the ultrahard material body and the material forming the substrate. In some embodiments, multiple transition layers may be formed of varying mixtures of the material forming the ultrahard material body and the material forming the substrate, for example, to form opposing gradients of ultrahard material and substrate material, thereby also forming a gradient of coefficient of thermal expansion.

Each of the embodiments described herein have at least one ultrahard layer (made of an ultrahard material) included therein. Such ultrahard materials may include a polycrystalline diamond table (a table of interconnected diamond particles having interstitial spaces therebetween in which a metal component (such as a metal catalyst) may reside, a thermally stable diamond layer (i.e., having a thermal stability greater than that of conventional polycrystalline diamond, 750° C.) formed, for example, by removing substantially all metal from the interstitial spaces between interconnected diamond particles or from a diamond/silicon carbide composite, or other ultrahard material such as a cubic boron nitride.

As known in the art, thermally stable diamond may be formed in various manners. A conventional polycrystalline diamond layer includes individual diamond "crystals" that are interconnected. The individual diamond crystals thus form a lattice structure. A metal catalyst, such as cobalt, may be used to promote recrystallization of the diamond particles and formation of the lattice structure. Thus, cobalt particles are typically found within the interstitial spaces in the diamond lattice structure. Cobalt has a significantly different coefficient of thermal expansion as compared to diamond. Therefore, upon heating of a diamond table, the cobalt and the diamond lattice will expand at different rates, causing cracks to form in the lattice structure and resulting in deterioration of the diamond table.

To obviate this problem, strong acids may be used to "leach" the cobalt from a polycrystalline diamond lattice structure (either a thin volume or entire tablet) to at least reduce the damage experienced from heating diamond-cobalt composite at different rates upon heating. Briefly, a strong acid, typically hydrofluoric acid or combinations of several strong acids may be used to treat the diamond table, removing at least a portion of the co-catalyst from the PDC composite. Suitable acids include nitric acid, hydrofluoric acid, hydrochloric acid, sulfuric acid, phosphoric acid, or perchloric acid, or combinations of these acids. In addition, caustics, such as sodium hydroxide and potassium hydroxide, have been used to the carbide industry to digest metallic elements from carbide composites. In addition, other acidic and basic leaching agents may be used as desired. Those having ordinary skill in the art will appreciate that the molarity of the leaching agent may be adjusted depending on the time desired to leach, concerns about hazards, etc.

By leaching out the cobalt, thermally stable polycrystalline (TSP) diamond may be formed. In certain embodiments, a select portion of a diamond composite is leached, in order to gain thermal stability without losing impact resistance. As used herein, the term TSP includes both of the above (i.e., partially and completely leached) compounds. Interstitial volumes remaining after leaching may be reduced by either furthering consolidation or by filling the volume with a secondary material.

Alternatively, TSP may be formed by forming the diamond layer in a press using a binder other than cobalt, one such as silicon, which has a coefficient of thermal expansion more similar to that of diamond than cobalt has. During the manufacturing process, a large portion, 80 to 100 volume percent, of the silicon reacts with the diamond lattice to form silicon carbide which also has a thermal expansion similar to diamond. Upon heating, any remaining silicon, silicon carbide, and the diamond lattice will expand at more similar rates as compared to rates of expansion for cobalt and diamond, resulting in a more thermally stable layer. PDC cutters having a TSP cutting layer have relatively low wear rates, even as cutter temperatures reach 1,200° C. However, one of ordinary skill in the art would recognize that a thermally stable diamond layer may be formed by other methods known in the art, including, for example, by altering processing conditions in the formation of the diamond layer.

The substrate on which the ultrahard layer is disposed may be formed of a variety of hard particles. In one embodiment, the substrate may be formed from a suitable material such as tungsten carbide, tantalum carbide, or titanium carbide. Additionally, various binding metals may be included in the substrate, such as cobalt, nickel, iron, metal alloys, or mixtures thereof. In the substrate, the metal carbide grains are supported within the metallic binder, such as cobalt. Additionally, the substrate may be formed of a sintered tungsten carbide composite structure. It is well known that various metal carbide compositions and binders may be used, in addition to tungsten carbide and cobalt. Thus, references to the use of tungsten carbide and cobalt are for illustrative purposes only, and no limitation on the type of substrate or binder used is intended.

Figure 18:
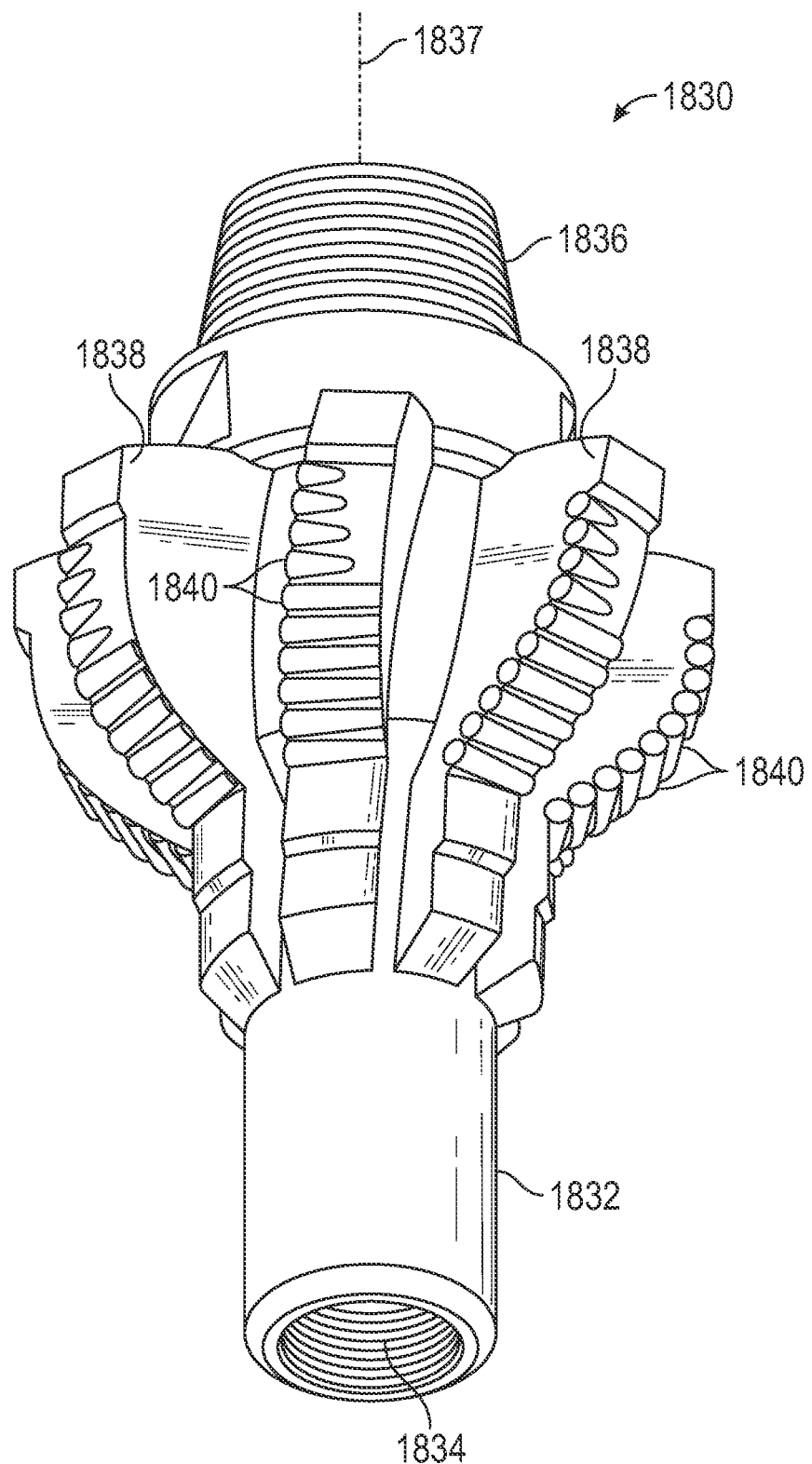
FIG. 18 is a side view of a hole opener, according to an embodiment of the present disclosure.

While the cutting elements of the present disclosure may be used on a drill bit, such as the type shown in FIG. 1, it is also intended that the cutting elements may be used on other types of downhole tools, including for example, a reamer, mill, or hole opener. FIG. 18 shows a general configuration of a hole opener 1830 that includes one or more cutting elements of the present disclosure. The hole opener 1830 comprises a tool body 1832 and a plurality of blades 1838 disposed at selected azimuthal locations about a circumference thereof. The hole opener 1830 generally comprises connections 1834, 1836 (e.g., threaded connections) so that the hole opener 1830 may be coupled to adjacent drilling tools that comprise, for example, a drillstring and/or bottom hole assembly (BHA) (not shown). The tool body 1832 generally includes a bore therethrough so that drilling fluid may flow through the hole opener 1830 as it is pumped from the surface (e.g., from surface mud pumps (not shown)) to a bottom of the wellbore (not shown).

Although only a few example embodiments have been described in detail above, those skilled in the art will readily appreciate that many modifications are possible in the example embodiments without materially departing from this invention. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke functional claiming for any limitations of any of the claims herein, except for those in which the claim expressly uses the words 'means for' together with an associated function.

What is claimed is:

1. A cutting element, comprising:
a central axis;
a substrate including an upper surface, wherein an interface surface is formed on the upper surface;
an ultrahard layer disposed on the interface surface, at least one portion of the upper surface of the substrate and the ultrahard layer defining a non-planar working surface of the cutting element such that the ultrahard layer forms a cutting edge, wherein a thickness of the ultrahard layer between the non-planar working surface and the interface surface varies along an axis perpendicular to the central axis, and the thickness of the ultrahard layer varies between 4 to 40% of an outer diameter of the cutting element at a thinnest section of the ultrahard layer, and the thickness of the ultrahard layer at a thickest section is greater than 8% of the outer diameter; and
wherein a peripheral edge of the non-planar working surface has at least one substrate edge portion and at least one ultrahard layer edge portion, the at least one substrate edge portion extending away from the cutting edge formed of the ultrahard layer.

2. The cutting element of claim 1, wherein the ultrahard layer forms the cutting edge and extends radially inward toward the central axis of the cutting element.

3. The cutting element of claim 2, wherein the ultrahard layer is an elongated segment extending from the cutting edge on a first side of the cutting element to a second side, and wherein the upper surface of the substrate extends along both sides of the elongated segment.

4. The cutting element of claim 3, wherein the elongated segment is wider at its ends than a radially interior portion of the elongated segment.

5. The cutting element of claim 4, wherein the elongated segment is wider at its ends than proximate the central axis.

6. The cutting element of claim 3, wherein a width of the elongated segment along at least one of its ends ranges from about 60% to 80% percent of the outer diameter of the cutting element.

7. The cutting element of claim 3, wherein the elongated segment is thicker at its ends than proximate the central axis.

8. The cutting element of claim 1, wherein the cutting element has an axisymmetric non-planar working surface with a cutting tip formed of the ultrahard layer surrounded by the substrate.

9. The cutting element of claim 1, wherein the interface surface includes at least one groove formed in the substrate including a varying radius of curvature.

10. The cutting element of claim 1, wherein the interface surface includes a plurality of parallel grooves.

11. The cutting element of claim 1, wherein the interface surface includes two sets of parallel grooves, the sets being substantially perpendicular to each other.

12. A cutting tool, comprising:
a tool body comprising a longitudinal axis;
a plurality of blades extending from the tool body about the longitudinal axis; and
at least one cutting element attached to one of the plurality of blades at a radial location about the longitudinal axis, the at least one cutting element including:
a substrate including an upper surface, wherein a non-planar interface surface is formed on the upper surface;
an ultrahard layer disposed on the non-planar interface surface;
a non-planar working surface including at least a portion of the upper surface of the substrate and at least a portion of the ultrahard layer, wherein the ultrahard layer forms a cutting portion of the working surface; and
wherein a peripheral edge of the non-planar working surface includes at least one substrate edge portion and at least one ultrahard layer edge portion.

13. The cutting tool of claim 12, wherein the interface surface includes a groove that extends from a first substrate side to a second substrate side of the substrate, wherein a first side of the cutting elements includes the first substrate side and a first portion of the ultrahard layer, and a second side of the cutting element includes the second substrate side and a second portion of the ultrahard layer.

14. The cutting tool of claim 12, wherein an apex of the working surface is at least partially defined by the upper surface of the substrate.

15. A cutting tool, comprising:
a tool body comprising a longitudinal axis;
a plurality of blades extending from the tool body about the longitudinal axis; and
at least one cutting element attached to one of the plurality of blades at a radial location about the longitudinal axis, the at least one cutting element including:
a substrate including a cylindrical side surface and an upper surface, wherein an interface surface is formed on the upper surface;
an ultrahard layer disposed on the interface surface and including a cutting edge;
a non-planar working surface defined by both the upper surface of the substrate and the ultrahard layer,
wherein a peripheral edge of the non-planar working surface between the non-planar working surface and the cylindrical side surface has at least one substrate edge portion and at least one ultrahard layer edge portion, the at least one substrate edge portion extending away from the cutting edge formed of the ultrahard layer.

16. The cutting tool of claim 15, wherein the ultrahard layer is an elongated segment extending from the cutting edge on a first side of the cutting element to a second side, and wherein a portion of the upper surface of the substrate is disposed on both sides of the elongated segment.

17. The cutting tool of claim 15, wherein the cutting element has an axisymmetric non-planar working surface with a cutting tip formed of the ultrahard layer surrounded by the substrate.

18. The cutting tool of claim 15, wherein the interface surface includes a varying radius of curvature.

* * * * *